United States Patent
Lietz et al.

(10) Patent No.: US 9,444,818 B2
(45) Date of Patent: Sep. 13, 2016

(54) METHOD AND SYSTEM FOR AUTOMATICALLY MANAGING SECURE COMMUNICATIONS IN MULTIPLE COMMUNICATIONS JURISDICTION ZONES

(71) Applicant: Intuit Inc., Mountain View, CA (US)

(72) Inventors: M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 49 days.

(21) Appl. No.: 14/070,168

(22) Filed: Nov. 1, 2013

(65) Prior Publication Data
US 2015/0128204 A1     May 7, 2015

(51) Int. Cl.
H04L 29/06     (2006.01)

(52) U.S. Cl.
CPC ............ H04L 63/10 (2013.01); H04L 63/105 (2013.01); H04L 63/107 (2013.01); H04L 63/20 (2013.01)

(58) Field of Classification Search
None
See application file for complete search history.

(56) References Cited

U.S. PATENT DOCUMENTS

| | | |
|---|---|---|
| 5,003,596 A | 3/1991 | Wood |
| 6,157,723 A | 12/2000 | Schultz |
| 6,324,648 B1 | 11/2001 | Grantges, Jr. |
| 6,889,210 B1 | 5/2005 | Vainstein |
| 6,981,041 B2 | 12/2005 | Araujo et al. |
| 6,996,716 B1 | 2/2006 | Hsu |
| 7,178,033 B1 | 2/2007 | Garcia |
| 7,336,790 B1 | 2/2008 | Caronni et al. |
| 7,380,120 B1 | 5/2008 | Garcia |
| 7,434,045 B1 | 10/2008 | Enderwick et al. |

(Continued)

FOREIGN PATENT DOCUMENTS

| | | |
|---|---|---|
| EP | 0906677 | 1/1998 |
| EP | 2645673 | 10/2013 |

(Continued)

OTHER PUBLICATIONS

Reddy et al., "Security Architecture of Cloud Computing," *International Journal of Engineering Science and Technology (IJEST)*, vol. 3, No. 9, Sep. 9, 2011, pp. 7149-7155.

(Continued)

*Primary Examiner* — Tri Tran
(74) *Attorney, Agent, or Firm* — Hawley Troxell Ennis & Hawley LLP; Philip McKay

(57) ABSTRACT

Communications and data security policy data for two or more communications jurisdiction zones is obtained that includes data indicating allowed protocols for the respective communications jurisdiction zones. Data indicating a desired exchange of data between a first resource in a first communications jurisdiction zone and a second resource in a second communications jurisdiction zone is received/obtained. The first communications jurisdiction zone communications and data security policy data and the second communications jurisdiction zone policy data is automatically obtained and analyzed to determine an allowed type of secure communications security level for the desired exchange of data that complies with both the first communications jurisdiction zone communications and data security policy data and the second communications jurisdiction zone policy data. A communications channel, including the allowed type of secure communications security level, is automatically establishing between the first resource and the second resource.

31 Claims, 5 Drawing Sheets

(56) References Cited

U.S. PATENT DOCUMENTS

| | | | |
|---|---|---|---|
| 7,546,629 B2 | 6/2009 | Albert et al. | |
| 7,715,565 B2 | 5/2010 | Kimmel et al. | |
| 7,739,501 B2 | 6/2010 | Kimmel et al. | |
| 7,983,423 B1 | 7/2011 | Agarwal et al. | |
| 8,095,960 B2 | 1/2012 | Boogert et al. | |
| 8,316,237 B1 | 11/2012 | Felsher et al. | |
| 8,352,999 B1 | 1/2013 | Zhan et al. | |
| 8,498,941 B2 | 7/2013 | Felsher | |
| 8,560,857 B2 | 10/2013 | Munetoh et al. | |
| 8,656,189 B2 | 2/2014 | Orsini et al. | |
| 8,700,906 B2 | 4/2014 | Kamara et al. | |
| 8,826,013 B1 | 9/2014 | Kodukula et al. | |
| 8,880,882 B2 | 11/2014 | Kulkarni et al. | |
| 2002/0023065 A1 | 2/2002 | Frelechoux et al. | |
| 2004/0210591 A1 | 10/2004 | Hirschfeld et al. | |
| 2005/0138110 A1 | 6/2005 | Redlich et al. | |
| 2006/0062238 A1* | 3/2006 | Mahendran | H04L 12/2602 370/437 |
| 2006/0215839 A1 | 9/2006 | Augenstein et al. | |
| 2006/0291664 A1 | 12/2006 | Suarez et al. | |
| 2007/0156781 A1 | 7/2007 | Kapoor et al. | |
| 2007/0195960 A1 | 8/2007 | Golman et al. | |
| 2007/0276931 A1 | 11/2007 | Mahdavi et al. | |
| 2008/0013569 A1 | 1/2008 | Boren | |
| 2008/0072309 A1 | 3/2008 | Kleinsteiber et al. | |
| 2008/0083036 A1 | 4/2008 | Ozzie et al. | |
| 2008/0098392 A1 | 4/2008 | Wipfel et al. | |
| 2008/0109491 A1 | 5/2008 | Gupta | |
| 2008/0319909 A1 | 12/2008 | Perkins et al. | |
| 2009/0092252 A1 | 4/2009 | Noll et al. | |
| 2009/0103724 A1 | 4/2009 | Tamai | |
| 2009/0204631 A1 | 8/2009 | Pomroy et al. | |
| 2009/0287837 A1 | 11/2009 | Felsher | |
| 2010/0082991 A1 | 4/2010 | Baldwin et al. | |
| 2010/0189251 A1 | 7/2010 | Curren | |
| 2011/0004752 A1 | 1/2011 | Shukla | |
| 2011/0022812 A1 | 1/2011 | van der Linden et al. | |
| 2011/0093707 A1 | 4/2011 | Green et al. | |
| 2011/0113236 A1 | 5/2011 | Chenard et al. | |
| 2011/0158406 A1 | 6/2011 | Marcia et al. | |
| 2011/0188651 A1 | 8/2011 | Iswandhi et al. | |
| 2011/0191595 A1 | 8/2011 | Damian et al. | |
| 2011/0219035 A1 | 9/2011 | Korsunsky et al. | |
| 2011/0277027 A1 | 11/2011 | Hayton et al. | |
| 2012/0131189 A1 | 5/2012 | Smart et al. | |
| 2012/0185913 A1 | 7/2012 | Martinez et al. | |
| 2012/0204032 A1 | 8/2012 | Wilkins et al. | |
| 2012/0303776 A1 | 11/2012 | Ferris | |
| 2012/0311564 A1 | 12/2012 | Khalid | |
| 2013/0019284 A1 | 1/2013 | Pacyga et al. | |
| 2013/0060825 A1 | 3/2013 | Farcasiu et al. | |
| 2013/0097706 A1 | 4/2013 | Titonis et al. | |
| 2013/0104213 A1 | 4/2013 | Nandakumar | |
| 2013/0125247 A1 | 5/2013 | Sprague et al. | |
| 2013/0204849 A1 | 8/2013 | Chacko | |
| 2013/0219456 A1 | 8/2013 | Sharma et al. | |
| 2013/0254539 A1 | 9/2013 | Auradkar et al. | |
| 2013/0346558 A1* | 12/2013 | Khalidi et al. | 709/218 |
| 2014/0007178 A1 | 1/2014 | Gillum et al. | |
| 2014/0007239 A1 | 1/2014 | Sharpe et al. | |
| 2014/0026179 A1 | 1/2014 | Devarajan et al. | |
| 2014/0068732 A1 | 3/2014 | Hinton et al. | |
| 2014/0074637 A1 | 3/2014 | Hammad | |
| 2014/0075499 A1 | 3/2014 | Arun et al. | |
| 2014/0165134 A1 | 6/2014 | Goldschlag et al. | |
| 2014/0244585 A1 | 8/2014 | Sivasubramanian et al. | |
| 2014/0282840 A1* | 9/2014 | Guinan | 726/1 |
| 2014/0283010 A1 | 9/2014 | Rutkowski et al. | |
| 2014/0330869 A1 | 11/2014 | Factor et al. | |

FOREIGN PATENT DOCUMENTS

| | | |
|---|---|---|
| GB | 2477682 | 11/2009 |
| GB | 2524632 | 1/2015 |
| WO | WO 2010/144735 | 12/2010 |

OTHER PUBLICATIONS

Cabrera et al., "Method and System for Distributing Secrets," U.S. Appl. No. 14/053,488, filed Oct. 14, 2013.

Cabrera et al., "Method and System for Providing a Secure Secrets Proxy," U.S. Appl. No. 14/054,450, filed Oct. 15, 2013.

Weaver et al., "Method and System for Automatically Managing Secret Application and Maintenance," U.S. Appl. No. 14/069,921, filed Nov. 1, 2013.

Cabrera et al., "Method and System for Automatically Managing Secrets in Multiple Data Security Jurisdiction Zones," U.S. Appl. No. 14/073,110, filed Nov. 6, 2013.

Lietz et al., "Method and System for Accommodating Communications Channels Using Different Secure Communications Protocols," U.S. Appl. No. 14/215,432, filed Mar. 17, 2014.

Lietz et al., "Method and Apparatus to Rotate Data Encryption Keys in Databases with No Down Time," U.S. Appl. No. 14/263,808, filed Apr. 28, 2014.

Cabrera et al., "Method and Apparatus for Multi-Tenancy Secrets Management," U.S. Appl. No. 14/265,930, filed Apr. 30, 2014.

* cited by examiner

METHOD AND SYSTEM FOR AUTOMATICALLY MANAGING SECURE COMMUNICATIONS IN MULTIPLE COMMUNICATIONS JURISDICTION ZONES

BACKGROUND

As various forms of distributed computing, such as cloud computing, have come to dominate the computing landscape, modern computing has become a global endeavor. One difficulty encountered when computing on a global scale is the fact that different geographic and political regions have different rules and regulations, i.e., communications and data security policies, dictating the various types of secrets, security protocols, and security levels, such as encryption levels, that can be used to protect data within these different geographic and political regions.

As a specific illustrative example, the government of China allows only relatively low levels of encryption to be applied to data that is transferred to resources within China. In contrast, many European countries allow for a higher level of encryption to be applied to data that is transferred to resources within their territories. Consequently, an application, service, or system, desiring to transfer data between China and Europe must ensure that the level encryption used either in the communications channel itself, or to encrypt data in a message being sent via a communication channel, is encrypted at a level that is allowed both under Chinese communications and data security policy and European communications and data security policy.

Consequently, in a global computing environment, there is an added complexity of making sure that secure communications channels, and other secrets, used in, or deployed to, different geographic and political regions, are in compliance with the rules and regulations, i.e., the communications and data security policies, governing secure communications and the protection of data within the various geographic and political regions.

This situation, in and of itself, presents a level of complication that often interferes with the efficient processing and transferring of data required in modern computing environments, such as a cloud computing environment. However, the situation is further complicated and aggravated by the fact that there often exist different communications and data security zones, with distinct and different communications and data security policy requirements, within a given geographic or political region, and often within the same computing environment.

As an example, an application or service implemented in a cloud computing environment may, in some cases, be communicating with, or facilitating communication between, two resources, such as two virtual instances, that lie in different communications and data security zones within the same cloud computing environment or network, but are instantiated in the same geographic and political region. In this case, just as in the case of two resources communicating in different geographic or political regions, it must be confirmed that the communications and data security policies of both communications and data security zones are met.

As used herein, a given geographic, political, communications and data security zone, resource, and/or computing environment, having its own associated communications and data security policy is referred to as a communications jurisdiction zone. Consequently, as used herein, the term communications jurisdiction zone refers to both geographic and political zones as well as virtual communications and data security zones within various computing environments.

Given the situation described above, significant amounts of time and energy are currently devoted to ensuring that the communications and data security policies associated with various communications jurisdiction zones are met before communications channels are provided between two communications jurisdiction zones, and/or secrets are transferred between two communications jurisdiction zones. As noted, this often significantly interferes with the efficient and effective operation of various, and numerous, computing environments.

What is needed is a method and system to automatically determine the communications and data security policies associated with various communications jurisdiction zones and then, when communication is desired between two resources residing in two different communications jurisdiction zones, automatically determine the appropriate communications channels and secure communications security levels to deploy in order to provide the desired communication capability and remain in compliance with the communications and data security policies of the communications jurisdiction zones involved.

SUMMARY

In accordance with one embodiment, a method and system for automatically managing secure communications across multiple communications jurisdiction zones includes identifying two or more communications jurisdiction zones from which, and/or to which, data may be transferred using one or more types of communications channels including one or more types of secure communications security levels. In one embodiment, communications and data security policy data for the identified communications jurisdiction zones is obtained that includes data indicating allowed types of secure communications security levels for the respective communications jurisdiction zones.

In one embodiment, data indicating a desired exchange of data between a first resource in a first communications jurisdiction zone and a second resource in a second communications jurisdiction zone is received/obtained. In one embodiment, the first communications jurisdiction zone policy data associated with the first communications jurisdiction zone and the second communications jurisdiction zone policy data associated with the second communications jurisdiction zone is automatically obtained from the communications and data security policy data.

In one embodiment, the data indicating the desired exchange of data is automatically analyzed to determine a required type of communications channel and then the first communications jurisdiction zone policy data and the second communications jurisdiction zone policy data are automatically analyzed to determine at least one allowed type of secure communications security level for the desired exchange of data that complies with both the first communications jurisdiction zone policy data and the second communications jurisdiction zone policy data.

In one embodiment, one of the at least one allowed type of secure communications security level is then selected and the required type of communications channel, including the selected allowed type of secure communications security level, is automatically established between the first resource and the second resource.

Figure 1:
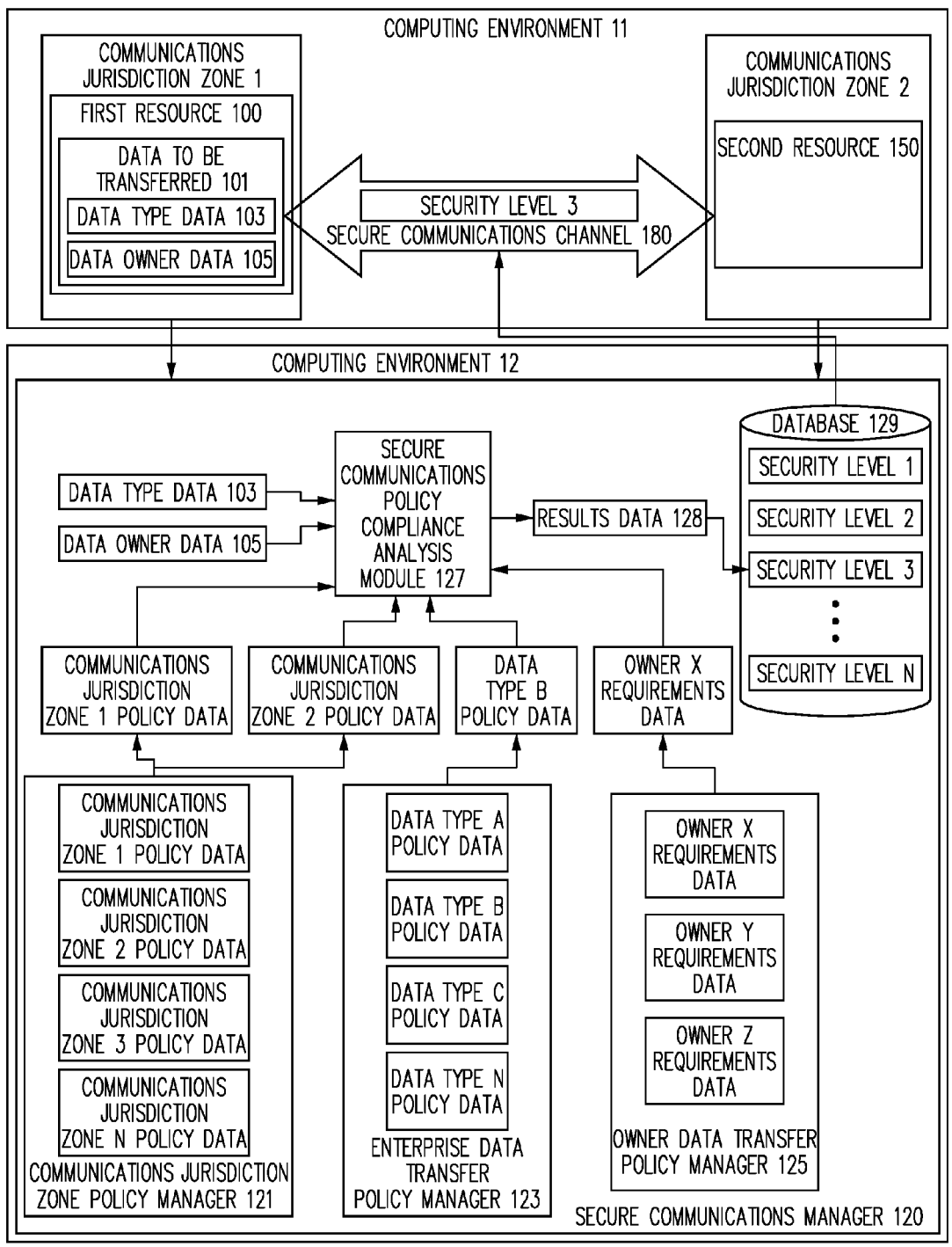
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for automatically managing secure communications across multiple communications jurisdiction zones includes a process for automatically managing secure communications across multiple communications jurisdiction zones implemented, at least in part, by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for automatically managing secure communications across multiple communications jurisdiction zones are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations, a party may wish to transfer data between two trusted computing environments, and/or two untrusted computing environments.

In one embodiment, two or more computing systems, and/or two or more computing environments, are connected by one or more communications systems, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional diagram of the interaction of various elements associated with one embodiment of the method and system for automatically managing secure communications across multiple communications jurisdiction zones discussed herein. Of particular note, the various elements in FIG. 1 are shown for illustrative purposes as being associated with specific computing environments, such as computing environment 11 and computing environment 12. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center keeping or accessing the secrets data, a party and/or entity providing all or a portion of a cloud-based computing environment, the owner or a provider of a service, the owner or provider of one or more resources accessible using the secrets, and/or any other party and/or entity providing one or more functions, and/or any other party and/or entity as discussed herein, and/or as known in the art at the time of filing, and/or as made known after the time of filing.

In accordance with one embodiment, two or more communications jurisdiction zones from which, and/or to which, data may be transferred using one or more types of communications channels including one or more types of secure communications security levels are identified.

As noted above, herein communications jurisdiction zones can be, but are not limited to, physical geographical communications jurisdiction zones, such as geographical regions on the planet subject to specific communications and data security policies; political zones, such as countries or states subject to specific communications and data security policies; communications and data security zones, such as networks, clouds, or portions thereof, subject to specific communications and data security policies; resources and/or networks of resources subject to specific communications and data security policies; computing environments subject to specific communications and data security policies; and/or any other physically, politically, or virtually delineated communications jurisdiction zones subject to specific communications and data security policies, as discussed herein, and/or as known in the art at the time of filing, and/or as developed/become known after the time of filing.

In one embodiment, the two or more communications jurisdiction zones are identified as communications jurisdiction zones likely to be the location of one or more resources within a cloud computing environment, or other decentralized computing system.

In one embodiment, for each of the identified two or more communications jurisdiction zones, communications and data security policy data is obtained including data indicating allowed and/or required types of secure communications security levels for that identified communications jurisdiction zone.

In various embodiments, the communications and data security policy data can include, but is not limited to, communications and data security policy data associated with political entities such as local, state, national, or regional government agencies; communications and data security policy data associated with networks or sub networks of computing systems such as virtual private networks, local area networks, and wide area networks, and/or portions thereof; communications and data security policy data associated with cloud computing environments, or portions of cloud computing environments such as virtual private clouds, private clouds, or portions of a cloud computing environment implemented in different geographic regions; and/or any other communications policy data related to any communications jurisdiction zone, setting forth the allowed and/or required types of secure communications security levels that can, or must, be employed in that communications jurisdiction zone.

In one embodiment, the communications and data security policy data is stored and/or managed and updated through a policy manager.

Referring to FIG. 1, secure communications manager 120 is shown as being implemented in computing environment 12. As seen in FIG. 1, communications jurisdiction zone policy manager 121 is shown as including communications jurisdiction zone 1 policy data, communications jurisdiction zone 2 policy data, and communications jurisdiction zone 3 policy data through communications jurisdiction zone "N" policy data representing communications and data security policies associated with identified communications jurisdiction zones 1 through N, indicating the allowed and/or required types of secure communications security levels, represented by security level 1, security level 2, and security level 3 through N in database 129, that can be used, or must be used, for secure communications in each of the communications jurisdiction zones 1 through N.

In one embodiment, data is obtained indicating, or requesting, a desired exchange of data between a first resource in a first communications jurisdiction zone and a second resource in a second communications jurisdiction zone.

Herein, the term "resource" refers to any software or hardware entity or component capable of transferring and/or receiving data. As one specific illustrative example, in one embodiment, one or more of the first or second resources includes a virtual asset implemented in a cloud computing environment.

As used herein, the term "virtual asset" includes any virtualized entity or resource, and/or a part of an actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In other embodiments, one or more of the first and second resources can include one or more components or systems deployed in a data center; one or more physical or virtual server computing systems; one or more physical or virtual workstations; one or more database systems or storage clusters; one or more switching systems; one or more routers; any hardware system; any communications systems; any form of proxy system; one or more gateway systems; one or more firewall systems; one or more load balancing systems; one or more applications and/or services; and/or any other software or hardware entity or entities capable of transmitting and/or receiving data as discussed herein, and/or as known in the art at the time of filing, and/or as developed/made available after the time of filing.

In various embodiments, the types of data desired to be transferred between resources in different communications jurisdiction zones includes, but is not limited to, messages, such as email and text messages; files; images; secrets; and/or any other data and/or information type as discussed herein, and/or as known in the art at the time of filing, and/or as developed/made available after the time of filing.

In various embodiments, the data to be transferred between the first resource and the second resource includes data type data indicating the type of data to be transferred and data owner data indicating the entity or party that is the source of the data to be transferred, and/or that "owns" the data to be transferred.

In one embodiment, a determination is made that the first resource resides in, and/or is subject to the communications and data security policies, of a first communications jurisdiction zone using information contained in the IP address associated with the first resource, and/or any other mechanism as discussed herein, and/or as known in the art at the time of filing, and/or as developed/made available after the time of filing, for determining a communications jurisdiction zone associated with a resource or communications endpoint. Similarly, in one embodiment, a determination is made that the second resource resides in, and/or is subject to the communications and data security policies, of a second communications jurisdiction zone using information contained in the IP address associated with the second resource, and/or any other mechanism as discussed herein, and/or as known in the art at the time of filing, and/or as developed/made available after the time of filing, for determining a communications jurisdiction zone associated with a resource or communications endpoint.

Referring to FIG. 1, first resource 100 is shown as residing in communications jurisdiction zone 1 and second resource 150 is shown as residing in communications jurisdiction zone 2. As also seen in FIG. 1, in this specific illustrative example, first resource 100 is shown as the sending, or transferring, resource and includes data to be transferred 101 that is a subject of request to transfer data to be transferred 101 from first resource 100 to second resource 150. As also seen in FIG. 1, data to be transferred 101 includes data type data 103 indicating the data type of data to be transferred 101 and data owner data 105 indicating the entity or party providing data to be transferred 101. As also shown in FIG. 1, in this specific illustrative example, both first resource 100 and second resource 150 are shown as being implemented in computing environment 11. In one embodiment, computing environment 11 is a cloud computing environment and first resource 100 and second resource 150 are virtual assets instantiated in computing environment 11.

In one embodiment, once it is determined that a transfer of data is desired between a first resource in a first communications jurisdiction zone and a second resource in a second communications jurisdiction zone, the communications and data security policy data for the first communications jurisdiction zone and the communications and data security policy data for the second communications jurisdiction zone is obtained from the communications and data security policy data stored and/or managed and updated through a policy manager.

Referring to FIG. 1, based on first resource 100 being in communications jurisdiction zone 1 and second resource 150 being in communications jurisdiction zone 2, communications and data security policy data for the communications jurisdiction zone 1, represented by communications jurisdiction zone 1 policy data, and communications and data security policy data for the communications jurisdiction zone 2, represented by communications jurisdiction zone 2 policy data, is obtained from communications jurisdiction zone policy manager 121.

In one embodiment, the data to be transferred between the first resource in the first communications jurisdiction zone and the second resource in the second communications jurisdiction zone is automatically analyzed to determine the type of data to be transferred.

As noted above, the types of data desired to be transferred can include, but are not limited to, messages, such as email and text messages; files; images; secrets; and/or any other data and/or information type as discussed herein, and/or as known in the art at the time of filing, and/or as developed/made available after the time of filing.

In various embodiments, the type of data to be transferred determines the type of communication channel to be established between the first resource in the first communications jurisdiction zone and the second resource in the second communications jurisdiction zone, i.e., the type and form of data to be transferred determines the secure communications protocol to be employed to provide a secure communications channel between the first resource and the second resource.

In various embodiments, the communications channels to be established can be, but are not limited to, a Secure Sockets Layer (SSL) communications channel; a Transport Layer Security (TLS) communications channel; a Simple Transportation Management Protocol (STMP) communications channel; a Simple Mail Transfer Protocol (SMTP) communications channel; a Spanning Tree Protocol (STP) communications channel; an Internet Control Message Protocol (ICMP) communications channel; and/or any secure communication protocol channel, as discussed herein, and/or as known in the art at the time of filing, and/or as developed after the time of filing, providing some form or level of secure communications security.

In one embodiment, once the type of data to be transferred is determined which, in turn, determines the required type of communications channel, i.e., the secure communications protocol to be employed, the communications and data security policy data for the first communications jurisdiction zone and the communications and data security policy data for the second communications jurisdiction zone is automatically analyzed to determine at least one allowed type of secure communications security level for the desired exchange of data that complies with both the first communications jurisdictional zone policy data and the second communications jurisdictional zone policy data.

In various embodiments, the allowed type of secure communications security level for the desired exchange of data that complies with both the first communications jurisdictional zone policy data and the second communications jurisdictional zone policy data includes, but is not limited to, the type and/or length of encryption applied to the data to be transferred, and/or all communications and data transfer performed, using the required communications channel.

In other embodiments, other types of secure communications security level for the desired exchange of data that complies with both the first communications jurisdictional zone policy data and the second communications jurisdictional zone policy data are determined, such as any secure communications security level as discussed herein, and/or as known in the art at the time of filing, and/or as developed/made available after the time of filing.

Referring to FIG. 1, the fact that first resource 100 resides in communications jurisdiction zone 1 and second resource 150 resides in communications jurisdiction zone 2 is used as input data to secure communications policy compliance analysis module 127. As seen in FIG. 1, in one embodiment, secure communications policy compliance analysis module 127 uses this input data to pull communications jurisdiction zone 1 policy data and communications jurisdiction zone 2 policy data from communications jurisdiction zone manager 121.

In this specific illustrative example, communications jurisdiction zone 1 policy data and communications jurisdiction zone 2 policy data are compared at secure communications policy compliance analysis module 127 to generate results data 128 indicating that security level 3 is the allowed type of secure communications security level for the desired exchange of data to be transferred 101 data that complies with both the communications jurisdiction zone 1 policy data and communications jurisdiction zone 2 policy data.

In one embodiment, once at least one allowed type of secure communications security level is identified that complies with both the first communications jurisdictional zone policy data and the second communications jurisdictional zone policy data, one of the at least one allowed type of secure communications security level is selected. In one embodiment, a communications channel of the required communications channel type including the selected secure communications security level is automatically established, or implemented, between the first resource in the first communications jurisdiction zone and the second resource in the second communications jurisdiction zone.

Referring to FIG. 1, secure communications channel 180, i.e., the identified required communications channel type, is shown as having been deployed with selected security level 3 secure communications security level, to facilitate the transfer of data to be transferred 101 from first resource 100 in communications jurisdiction zone 1 to second resource 150 in communications jurisdiction zone 2.

Using the method and system for automatically managing secure communications across multiple communications jurisdiction zones discussed herein, communications and data security policies associated with various communications jurisdiction zones is obtained. Then when communication is desired between two resources residing in two different communications jurisdiction zones, the communications and data security policies for the two communications jurisdiction zones are automatically analyzed to identify the appropriate communications channel including a secure communications security level satisfying both the data security policies for the two communications jurisdiction zones. In one embodiment, the appropriate communications channel including the selected secure communications security level is automatically deployed to provide the desired communication capability and remain in compliance with communications and the data security policies of the communications jurisdiction zones involved.

Consequently, using the method and system for automatically managing secure communications across multiple communications jurisdiction zones discussed herein, appropriate communications channels between resources in different communications jurisdiction zones is automatically, and transparently, provided in an efficient and effective manner.

In one embodiment, in addition to communications and data security policy data for the identified communications jurisdiction zones, secure communications polices provided by an enterprise implementing or controlling the first and second resources, and/or the data to be transferred, are taken into consideration.

In accordance with one embodiment, two or more communications jurisdiction zones from which, and/or to which, data may be transferred using one or more types of communications channels including one or more types of secure communications security levels are identified.

In one embodiment, the two or more communications jurisdiction zones are identified as communications jurisdiction zones likely to be the location of one or more resources within a cloud computing environment, or other decentralized computing system.

In one embodiment, for each of the identified two or more communications jurisdiction zones, communications and data security policy data is obtained including data indicating allowed and/or required types of secure communications security levels for that identified communications jurisdiction zone.

In one embodiment, the communications and data security policy data is stored and/or managed and updated through a policy manager.

In one embodiment, data is obtained indicating, or requesting, a desired exchange of data between a first resource in a first communications jurisdiction zone and a second resource in a second communications jurisdiction zone.

In various embodiments, the data to be transferred between the first resource and the second resource includes data type data indicating the type of data to be transferred and data owner data indicating the entity or party that is the source of the data to be transferred, and/or that "owns" the data to be transferred.

In one embodiment, a determination is made that the first resource resides in, and/or is subject to the communications and data security policies, of a first communications jurisdiction zone using information contained in the IP address associated with the first resource, and/or any other mechanism as discussed herein, and/or as known in the art at the time of filing, and/or as developed/made available after the time of filing, for determining a communications jurisdiction zone associated with a resource or communications endpoint. Similarly, in one embodiment, a determination is made that the second resource resides in, and/or is subject to the communications and data security policies, of a second communications jurisdiction zone using information contained in the IP address associated with the second resource, and/or any other mechanism as discussed herein, and/or as known in the art at the time of filing, and/or as developed/made available after the time of filing, for determining a communications jurisdiction zone associated with a resource or communications endpoint.

In one embodiment, once it is determined that a transfer of data is desired between a first resource in a first communications jurisdiction zone and a second resource in a second communications jurisdiction zone, the communications and data security policy data for the first communications jurisdiction zone and the communications and data security policy data for the second communications jurisdiction zone is obtained from the communications and data security policy data stored and/or managed and updated through a policy manager.

In one embodiment, the data to be transferred between the first resource in the first communications jurisdiction zone and the second resource in the second communications jurisdiction zone is automatically analyzed to determine the type of data to be transferred.

As noted above, the types of data desired to be transferred can include, but are not limited to, messages, such as email and text messages; files; images; secrets; and/or any other data and/or information type as discussed herein, and/or as known in the art at the time of filing, and/or as developed/made available after the time of filing.

In various embodiments, the type of data to be transferred determines the type of communication channel to be established between the first resource in the first communications jurisdiction zone and the second resource in the second communications jurisdiction zone, i.e., the type and form of data to be transferred determines the secure communications protocol to be employed to provide a secure communications channel between the first resource and the second resource.

In various embodiments, the communications channels to be established can be, but are not limited to, an SSL communications channel; a TLS communications channel; an STMP communications channel; an SMTP communications channel; an STP communications channel; an ICMP communications channel; and/or any secure communication protocol channel, as discussed herein, and/or as known in the art at the time of filing, and/or as developed after the time of filing, providing some secure communications security level.

In one embodiment, enterprise data transfer policy data including data indicating required types of secure communications security levels for one or more types of data is obtained. In one embodiment, enterprise data transfer policy data is obtained from an enterprise data transfer policy manager that includes enterprise data transfer policy data for each data type.

In one embodiment, the enterprise data transfer policy data including data indicating required types of secure communications security levels for one or more types of data is determined based, at least in part, on one or more data classification factors including, but not limited to, a determination as to the sensitivity of the data to be transferred as determined by the enterprise charged with protecting the data; a determination as to the sensitivity of the data to be transferred as determined by one or more regulations and/or regulatory agencies; a determination as to the sensitivity of the data to be transferred as determined based on the need to protect the identity and personal information of the owners and/or sources of the data to be protected; a determination of the risk associated with the data to be transferred; a determination of the vulnerability associated with the data to be transferred; a determination of the commercial value of the data to be transferred; a determination of the strategic value of the data to be transferred; a determination of the entertainment value of the data to be transferred; and/or any other data classification factors as discussed herein, and/or as known in the art at the time of filing, and/or as developed after the time of filing.

Referring to FIG. 1, enterprise data transfer policy manager 123 includes data type A policy data, data type B policy data, and data type C policy data through data type N policy data.

In one embodiment, data type data indicating the type of data involved in the desired exchange of data is obtained and automatically analyzed to determine the type of data to be exchanged.

In one embodiment, once the type of data to be transferred between the first resource in the first communications jurisdiction zone and the second resource in the second communications jurisdiction zone is determined, the enterprise data transfer policy data for the determined data type is automatically obtained and analyzed to generate enterprise allowed types of secure communications security levels data.

In one embodiment, the communications and data security policy data for the first communications jurisdiction zone, the communications and data security policy data for the second communications jurisdiction zone, and the enterprise allowed types of secure communications security levels data is automatically analyzed to determine at least one allowed type of secure communications security level for the desired exchange of data that complies with the first communications jurisdictional zone policy data, the second communications jurisdictional zone policy data, and the enterprise allowed types of secure communications security levels data.

In various embodiments, the allowed type of secure communications security level for the desired exchange of data that complies with the first communications jurisdictional zone policy data, the second communications jurisdictional zone policy data, and the enterprise allowed types of secure communications security levels data includes, but is not limited to, the type and/or length of encryption applied to the data to be transferred, and/or all communications and data transfer performed, using the required communications channel.

In other embodiments, other types of secure communications security for the desired exchange of data that complies with the first communications jurisdictional zone policy data, the second communications jurisdictional zone policy data, and the enterprise allowed types of secure communications security levels data, are determined, such as any secure communications security level as discussed herein, and/or as known in the art at the time of filing, and/or as developed/made available after the time of filing.

Referring to FIG. 1, the fact that first resource 100 resides in communications jurisdiction zone 1, second resource 150 resides in communications jurisdiction zone 2, and data type data 103 associated with data to be transferred 101 is used as input data to secure communications policy compliance analysis module 127. As seen in FIG. 1, in one embodiment, secure communications policy compliance analysis module 127 uses this input data to pull communications jurisdiction zone 1 policy data and communications jurisdiction zone 2 policy data from communications jurisdiction zone manager 121 and data type B policy data from enterprise data transfer policy manager 123.

In this specific illustrative example, communications jurisdiction zone 1 policy data, communications jurisdiction zone 2 policy data, and data type B policy data are compared at secure communications policy compliance analysis module 127 to generate results data 128 indicating that security level 3 is the allowed type of secure communications security level for the desired exchange of data to be transferred 101 data that complies with the communications jurisdiction zone 1 policy data, communications jurisdiction zone 2 policy data, and data type B policy data.

In one embodiment, once at least one allowed type of secure communications security level is identified that complies with the first communications jurisdictional zone policy data, the second communications jurisdictional zone policy data, and the enterprise data transfer policy data for the data type, one of the at least one allowed type of secure communications security level is selected. In one embodiment, a communications channel of the required communications channel type including the selected secure communications security level is automatically established, or implemented, between the first resource in the first communications jurisdiction zone and the second resource in the second communications jurisdiction zone.

Referring to FIG. 1, secure communications channel 180, i.e., the identified required communications channel type, is shown as having been deployed with selected security level 3 secure communications security level, to facilitate the transfer of data to be transferred 101 from first resource 100 in communications jurisdiction zone 1 to second resource 150 in communications jurisdiction zone 2.

Using the method and system for automatically managing secure communications across multiple communications jurisdiction zones discussed above, communications and data security policies associated with various communications jurisdiction zones and enterprise data transfer policy data for various data types is obtained. Then when communication is desired between two resources residing in two different communications jurisdiction zones, the communications and data security policies for the two communications jurisdiction zones and the enterprise data transfer policy data are automatically analyzed to identify the appropriate communications channel including a secure communications security level satisfying the data security policies for the two communications jurisdiction zones and the enterprise data transfer policy data. In one embodiment, the appropriate communications channel including the selected secure communications security level is automatically deployed to provide the desired communication capability and remain in compliance with communications and the data security policies of the communications jurisdiction zones involved and the enterprise data transfer policy data.

Consequently, using the method and system for automatically managing secure communications across multiple communications jurisdiction zones discussed herein, appropriate communications channels between resources in different communications jurisdiction zones is automatically, and transparently, provided in an efficient and effective manner.

In one embodiment, in addition to communications and data security policy data for the identified communications jurisdiction zones, secure communications polices provided by an owner of the data to be transferred are taken into consideration.

In accordance with one embodiment, two or more communications jurisdiction zones from which, and/or to which, data may be transferred using one or more types of communications channels including one or more types of secure communications security levels are identified.

In one embodiment, the two or more communications jurisdiction zones are identified as communications jurisdiction zones likely to be the location of one or more resources within a cloud computing environment, or other decentralized computing system.

In one embodiment, for each of the identified two or more communications jurisdiction zones, communications and data security policy data is obtained including data indicating allowed and/or required types of secure communications security levels for that identified communications jurisdiction zone.

In one embodiment, the communications and data security policy data is stored and/or managed and updated through a policy manager.

In one embodiment, data is obtained indicating, or requesting, a desired exchange of data between a first resource in a first communications jurisdiction zone and a second resource in a second communications jurisdiction zone.

In various embodiments, the data to be transferred between the first resource and the second resource includes data type data indicating the type of data to be transferred and data owner data indicating the entity or party that is the source of the data to be transferred, and/or that "owns" the data to be transferred.

In one embodiment, a determination is made that the first resource resides in, and/or is subject to the communications and data security policies, of a first communications jurisdiction zone using information contained in the IP address associated with the first resource, and/or any other mechanism as discussed herein, and/or as known in the art at the time of filing, and/or as developed/made available after the time of filing, for determining a communications jurisdiction zone associated with a resource or communications endpoint. Similarly, in one embodiment, a determination is made that the second resource resides in, and/or is subject to the communications and data security policies, of a second communications jurisdiction zone using information contained in the IP address associated with the second resource, and/or any other mechanism as discussed herein, and/or as known in the art at the time of filing, and/or as developed/made available after the time of filing, for determining a communications jurisdiction zone associated with a resource or communications endpoint.

In one embodiment, once it is determined that a transfer of data is desired between a first resource in a first communications jurisdiction zone and a second resource in a second communications jurisdiction zone, the communications and data security policy data for the first communications jurisdiction zone and the communications and data security policy data for the second communications jurisdiction zone is obtained from the communications and data security policy data stored and/or managed and updated through a policy manager.

In one embodiment, the data to be transferred between the first resource in the first communications jurisdiction zone and the second resource in the second communications jurisdiction zone is automatically analyzed to determine the type of data to be transferred.

As noted above, the types of data desired to be transferred can include, but are not limited to, messages, such as email and text messages; files; images; secrets; and/or any other data and/or information type as discussed herein, and/or as known in the art at the time of filing, and/or as developed/made available after the time of filing.

In various embodiments, the type of data to be transferred determines the type of communication channel to be established between the first resource in the first communications jurisdiction zone and the second resource in the second communications jurisdiction zone, i.e., the type and form of data to be transferred determines the secure communications protocol to be employed to provide a secure communications channel between the first resource and the second resource.

In various embodiments, the communications channels to be established can be, but are not limited to, an SSL communications channel; a TLS communications channel; an STMP communications channel; an SMTP communications channel; an STP communications channel; an ICMP communications channel; and/or any secure communication protocol channel, as discussed herein, and/or as known in the art at the time of filing, and/or as developed after the time of filing, providing some secure communications security level.

In one embodiment, data owner data transfer policy data indicating owner required types of secure communications security levels for one or more types of data is obtained. In one embodiment, the data owner data transfer policy data is obtained from an owner data transfer policy manager that includes owner data transfer policy data for each owner.

Referring to FIG. 1, owner data transfer policy manager 125 includes owner X requirements data, owner Y requirements data, and owner Z requirements data.

In one embodiment, data type data indicating the type of data involved in the desired exchange of data is obtained and automatically analyzed to determine the type of data to be exchanged.

In one embodiment, once the type of data to be transferred between the first resource in the first communications jurisdiction zone and the second resource in the second communications jurisdiction zone is determined, the owner data transfer policy data for the determined data type is automatically obtained and analyzed to generate owner allowed types of secure communications security levels data.

In one embodiment, the communications and data security policy data for the first communications jurisdiction zone, the communications and data security policy data for the second communications jurisdiction zone, and the owner allowed types of secure communications security levels data is automatically analyzed to determine at least one allowed type of secure communications security level for the desired exchange of data that complies with the first communications jurisdictional zone policy data, the second communications jurisdictional zone policy data, and the owner allowed types of secure communications security levels data.

In various embodiments, the allowed type of secure communications security level for the desired exchange of data that complies with the first communications jurisdictional zone policy data, the second communications jurisdictional zone policy data, and the owner allowed types of secure communications security levels data includes, but is not limited to, the type and/or length of encryption applied to the data to be transferred, and/or all communications and data transfer performed, using the required communications channel.

In other embodiments, other types of secure communications security level for the desired exchange of data that complies with the first communications jurisdictional zone policy data, the second communications jurisdictional zone policy data, and the owner allowed types of secure communications security levels data, are determined, such as any secure communications security level as discussed herein, and/or as known in the art at the time of filing, and/or as developed/made available after the time of filing.

Referring to FIG. 1, the fact that first resource 100 resides in communications jurisdiction zone 1, second resource 150 resides in communications jurisdiction zone 2, and data owner data 105 associated with data to be transferred 101 is used as input data to secure communications policy compliance analysis module 127. As seen in FIG. 1, in one embodiment, secure communications policy compliance analysis module 127 uses this input data to pull communications jurisdiction zone 1 policy data and communications jurisdiction zone 2 policy data from communications jurisdiction zone manager 121 and owner X requirements data from owner data transfer policy manager 125. In this specific illustrative example, communications jurisdiction zone 1 policy data, communications jurisdiction zone 2 policy data, and owner X requirements data are compared at secure communications policy compliance analysis module 127 to generate results data 128 indicating that security level 3 is the allowed type of secure communications security level for the desired exchange of data to be transferred 101 data that complies with the communications jurisdiction zone 1 policy data, communications jurisdiction zone 2 policy data, and owner X requirements data.

In one embodiment, once at least one allowed type of secure communications security level is identified that complies with the first communications jurisdictional zone policy data, the second communications jurisdictional zone policy data, and the owner data transfer policy data for the data type, one of the at least one allowed type of secure communications security level is selected. In one embodiment, a communications channel of the required communications channel type including the selected secure communications security level is automatically established, or implemented, between the first resource in the first communications jurisdiction zone and the second resource in the second communications jurisdiction zone.

Referring to FIG. 1, secure communications channel 180, i.e., the identified required communications channel type, is shown as having been deployed with selected security level 3 secure communications security level, to facilitate the transfer of data to be transferred 101 from first resource 100 in communications jurisdiction zone 1 to second resource 150 in communications jurisdiction zone 2.

Using the method and system for automatically managing secure communications across multiple communications jurisdiction zones discussed above, communications and data security policies associated with various communications jurisdiction zones and owner data transfer policy data for various data types is obtained. Then when communication is desired between two resources residing in two different communications jurisdiction zones, the communications and data security policies for the two communications jurisdiction zones and the owner data transfer policy data are automatically analyzed to identify the appropriate communications channel including a secure communications security level satisfying the data security policies for the two communications jurisdiction zones and the owner data transfer policy data. In one embodiment, the appropriate communications channel including the selected secure communications security level is automatically deployed to provide the desired communication capability and remain in compliance with communications and the data security policies of the communications jurisdiction zones involved and the owner data transfer policy data.

Consequently, using the method and system for automatically managing secure communications across multiple communications jurisdiction zones discussed herein, appropriate communications channels between resources in different communications jurisdiction zones is automatically, and transparently, provided in an efficient and effective manner.

In one embodiment, in addition to communications and data security policy data for the identified communications jurisdiction zones, both secure communications polices provided by an enterprise and the owner of the data to be transferred are taken into consideration.

In accordance with one embodiment, two or more communications jurisdiction zones from which, and/or to which, data may be transferred using one or more types of communications channels including one or more types of secure communications security levels are identified.

In one embodiment, the two or more communications jurisdiction zones are identified as communications jurisdiction zones likely to be the location of one or more resources within a cloud computing environment, or other decentralized computing system.

In one embodiment, for each of the identified two or more communications jurisdiction zones, communications and data security policy data is obtained including data indicating allowed and/or required types of secure communications security levels for that identified communications jurisdiction zone.

In one embodiment, the communications and data security policy data is stored and/or managed and updated through a policy manager.

In one embodiment, data is obtained indicating, or requesting, a desired exchange of data between a first resource in a first communications jurisdiction zone and a second resource in a second communications jurisdiction zone.

In various embodiments, the data to be transferred between the first resource and the second resource includes data type data indicating the type of data to be transferred and data owner data indicating the entity or party that is the source of the data to be transferred, and/or that "owns" the data to be transferred.

In one embodiment, a determination is made that the first resource resides in, and/or is subject to the communications and data security policies, of a first communications jurisdiction zone using information contained in the IP address associated with the first resource, and/or any other mechanism as discussed herein, and/or as known in the art at the time of filing, and/or as developed/made available after the time of filing, for determining a communications jurisdiction zone associated with a resource or communications endpoint. Similarly, in one embodiment, a determination is made that the second resource resides in, and/or is subject to the communications and data security policies, of a second communications jurisdiction zone using information contained in the IP address associated with the second resource, and/or any other mechanism as discussed herein, and/or as known in the art at the time of filing, and/or as developed/made available after the time of filing, for determining a communications jurisdiction zone associated with a resource or communications endpoint.

In one embodiment, once it is determined that a transfer of data is desired between a first resource in a first communications jurisdiction zone and a second resource in a second communications jurisdiction zone, the communications and data security policy data for the first communications jurisdiction zone and the communications and data security policy data for the second communications jurisdiction zone is obtained from the communications and data security policy data stored and/or managed and updated through a policy manager.

In one embodiment, the data to be transferred between the first resource in the first communications jurisdiction zone and the second resource in the second communications jurisdiction zone is automatically analyzed to determine the type of data to be transferred.

As noted above, the types of data desired to be transferred can include, but are not limited to, messages, such as email and text messages; files; images; secrets; and/or any other data and/or information type as discussed herein, and/or as known in the art at the time of filing, and/or as developed/made available after the time of filing.

In various embodiments, the type of data to be transferred determines the type of communication channel to be established between the first resource in the first communications jurisdiction zone and the second resource in the second communications jurisdiction zone, i.e., the type and form of data to be transferred determines the secure communications protocol to be employed to provide a secure communications channel between the first resource and the second resource.

In various embodiments, the communications channels to be established can be, but are not limited to, an SSL communications channel; a TLS communications channel; an STMP communications channel; an SMTP communications channel; an STP communications channel; an ICMP communications channel; and/or any secure communication protocol channel, as discussed herein, and/or as known in the art at the time of filing, and/or as developed after the time of filing, providing some secure communications security level.

In one embodiment, enterprise data transfer policy data including data indicating required types of secure communications security levels for one or more types of data is obtained. In one embodiment, enterprise data transfer policy data is obtained from an enterprise data transfer policy manager that includes enterprise data transfer policy data for each data type.

In one embodiment, data owner data transfer policy data indicating owner required types of secure communications security levels for one or more types of data is obtained. In one embodiment, the data owner data transfer policy data is obtained from an owner data transfer policy manager that includes owner data transfer policy data for each owner.

In one embodiment, data type data indicating the type of data involved in the desired exchange of data is obtained and automatically analyzed to determine the type of data to be exchanged.

In one embodiment, once the type of data to be transferred between the first resource in the first communications jurisdiction zone and the second resource in the second communications jurisdiction zone is determined, the enterprise data transfer policy data for the determined data type is automatically obtained and analyzed to generate enterprise allowed types of secure communications security levels data.

In one embodiment, once the type of data to be transferred between the first resource in the first communications jurisdiction zone and the second resource in the second communications jurisdiction zone is determined, the owner data transfer policy data for the determined data type is automatically obtained and analyzed to generate owner allowed types of secure communications security levels data.

In one embodiment, the communications and data security policy data for the first communications jurisdiction zone, the communications and data security policy data for the second communications jurisdiction zone, the enterprise allowed types of secure communications security levels data, and the owner allowed types of secure communications security levels data is automatically analyzed to determine at least one allowed type of secure communications security level for the desired exchange of data that complies with the first communications jurisdictional zone policy data, the second communications jurisdictional zone policy data, the enterprise allowed types of secure communications security levels data, and the owner allowed types of secure communications security levels data.

In various embodiments, the allowed type of secure communications security level for the desired exchange of data that complies with the first communications jurisdictional zone policy data, the second communications jurisdictional zone policy data, the enterprise allowed types of secure communications security levels data, and the owner allowed types of secure communications security levels data includes, but is not limited to, the type and/or length of encryption applied to the data to be transferred, and/or all communications and data transfer performed, using the required communications channel.

In other embodiments, other types of secure communications security level for the desired exchange of data that complies with the first communications jurisdictional zone policy data, the second communications jurisdictional zone policy data, the enterprise allowed types of secure communications security levels data, and the owner allowed types of secure communications security levels data, are determined, such as any secure communications security level as discussed herein, and/or as known in the art at the time of filing, and/or as developed/made available after the time of filing.

Referring to FIG. 1, the fact that first resource 100 resides in communications jurisdiction zone 1, second resource 150 resides in communications jurisdiction zone 2, data type data 103, and data owner data 105 associated with data to be transferred 101 is used as input data to secure communications policy compliance analysis module 127. As seen in FIG. 1, in one embodiment, secure communications policy compliance analysis module 127 uses this input data to pull communications jurisdiction zone 1 policy data and communications jurisdiction zone 2 policy data from communications jurisdiction zone manager 121, data type B policy data from enterprise data transfer policy manager 123, and owner X requirements data from owner data transfer policy manager 125. In this specific illustrative example, communications jurisdiction zone 1 policy data, communications jurisdiction zone 2 policy data, data type B policy data, and owner X requirements data are compared at secure communications policy compliance analysis module 127 to generate results data 128 indicating that security level 3 is the allowed type of secure communications security level for the desired exchange of data to be transferred 101 data that complies with the communications jurisdiction zone 1 policy data, communications jurisdiction zone 2 policy data, data type B policy data, and owner X requirements data.

Figure 2:
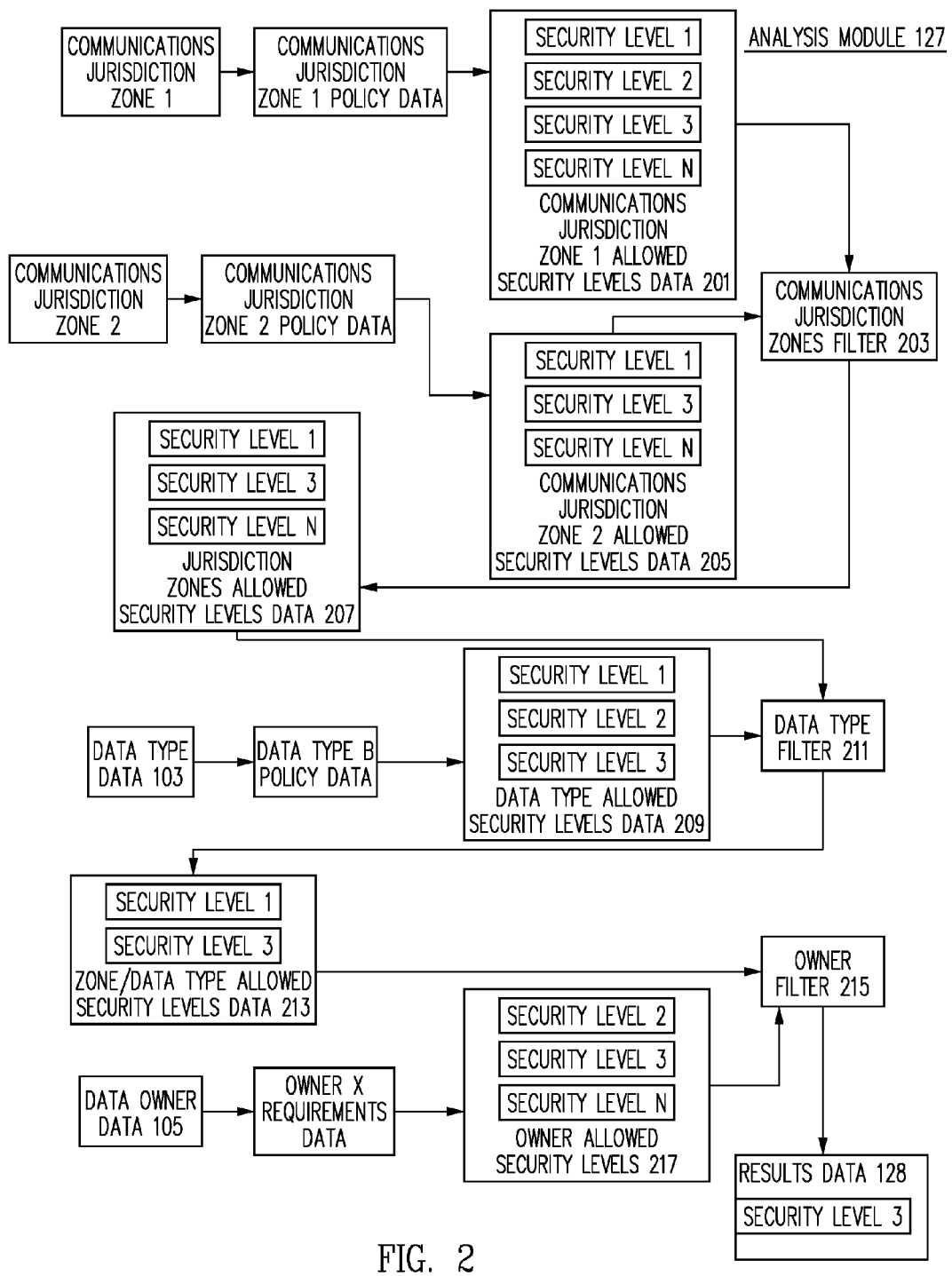
FIG. 2 shows one illustrative example of process diagram for a secure communications policy compliance analysis module in accordance with one embodiment.

FIG. 2 shows one illustrative example of process diagram for the operation of one embodiment of a secure communications policy compliance analysis module 127 when the first communications jurisdictional zone policy data, the second communications jurisdictional zone policy data, the enterprise allowed types of secure communications security levels data, and the owner data transfer policy data for the data type, are all used to determine at least one allowed type of secure communications security level.

Referring to FIG. 1 and FIG. 2 together, in the specific illustrative example of FIG. 2, the fact that first resource 100 resides in communications jurisdiction zone 1, results in secure communications policy compliance analysis module 127 pulling communications jurisdiction zone 1 policy data from communications jurisdiction zone manager 121. As seen in FIG. 2, communications jurisdiction zone 1 policy data dictates that communications jurisdiction zone 1 allowed security levels data 201 includes security level 1, security level 2, security level 3 and security level "N" as allowable security levels. As noted above, in one embodiment each security level equates to a level of encryption.

Similarly, referring back to FIG. 1 and FIG. 2 together, in the specific illustrative example of FIG. 2, the fact that second resource 150 resides in communications jurisdiction zone 2 results in secure communications policy compliance analysis module 127 pulling communications jurisdiction zone 2 policy data from communications jurisdiction zone manager 121. As seen in FIG. 2, communications jurisdiction zone 2 policy data dictates that communications jurisdiction zone 2 allowed security levels data 205 includes security level 1, security level 3, and security level "N" as allowable security levels. As noted above, in one embodiment each security level equates to a level of encryption.

In one embodiment, communications jurisdiction zone 1 allowed security levels data 201 and jurisdiction zone 2 allowed security levels data 205 are used as input data to communications jurisdiction zones filter 203 which compares the allowed security zones of communications jurisdiction zone 1 allowed security levels data 201 and jurisdiction zone 2 allowed security levels data 205 to generate jurisdiction zones allowed security levels data 207.

As seen in FIG. 2, since communications jurisdiction zone 1 policy data dictates that communications jurisdiction zone 1 allowed security levels data 201 includes security level 1, security level 2, security level 3 and security level "N" as allowable security levels and communications jurisdiction zone 2 policy data dictates that communications jurisdiction zone 2 allowed security levels data 205 includes security level 1, security level 3, and security level "N" as allowable security levels, the resultant filtered jurisdiction zones allowed security levels data 207 dictates that the jurisdiction zones allowed security levels are security level 1, security level 3, and security level "N", i.e., the overlapping security levels.

As seen in FIG. 2, in this specific illustrative example, data type data 103 is stipulated to indicate that data to be transferred 101 is of data type B. Consequently, in this specific illustrative example, secure communications policy compliance analysis module 127 pulls data type B policy data from enterprise data transfer policy manager 123. In this specific illustrative example, data type B policy data dictates that the allowed security levels of data type allowed security levels data 209 are security level 1, security level 2, and security level 3.

As seen in FIG. 2, jurisdiction zones allowed security levels data 207 and data type allowed security levels data 209 are used as input data to data type filter 211 which compares jurisdiction zones allowed security levels data 207 and data type allowed security levels data 209 to generate zone/data type allowed security levels data 213 that indicates, in this specific illustrative example, zone/data type allowed security levels of security level 1 and security level 3, i.e., the overlapping security levels of jurisdiction zones allowed security levels data 207 and data type allowed security levels data 209.

As seen in FIG. 2, in this specific illustrative example is stipulated that data owner data 105 indicates that the owner of data to be transferred 101 is owner X and therefore secure communications policy compliance analysis module 127 pulls owner X requirements data from owner data transfer policy manager 125. In this specific illustrative example, owner X requirements data dictates that the owner allowed security levels data 217 indicates security level 2, security level 3, and security level N are the owner allowed security levels.

As seen in FIG. 2, owner allowed security levels data 217 and zone/data type allowed security levels data 213 are used as input data to owner filter 215 which compares owner allowed security levels data 217 and zone/data type allowed security levels data 213 to generate results data 128.

In this specific illustrative example since zone/data type allowed security levels data 213 indicates zone/data type allowed security levels of security levels security level 1 and security level 3 are the only allowed security levels, and owner allowed security levels data 217 indicates security level 2, security level 3, and security level N are the only allowed security levels, results data 128 indicates that the only allowed security level is security level 3, i.e., the overlapping security level of zone/data type allowed security levels data 213 and owner allowed security levels data 217.

Consequently, in this specific illustrative example, security level 3 is identified as the allowed type of secure communications security level for the desired exchange of data to be transferred 101 that complies with the communications jurisdiction zone 1 policy data, communications jurisdiction zone 2 policy data, data type B policy data, and owner X requirements data.

In one embodiment, once at least one allowed type of secure communications security level is identified that complies with the first communications jurisdictional zone policy data, the second communications jurisdictional zone policy data, the enterprise allowed types of secure communications security levels data, and the owner data transfer policy data for the data type, one of the at least one allowed type of secure communications security level is selected. In one embodiment, a communications channel of the required communications channel type including the selected secure communications security level is automatically established, or implemented, between the first resource in the first communications jurisdiction zone and the second resource in the second communications jurisdiction zone.

Referring to FIG. 1, secure communications channel 180, i.e., the identified required communications channel type, is shown as having been deployed with selected security level 3 secure communications security level, to facilitate the transfer of data to be transferred 101 from first resource 100 in communications jurisdiction zone 1 to second resource 150 in communications jurisdiction zone 2.

Using the method and system for automatically managing secure communications across multiple communications jurisdiction zones discussed above, communications and data security policies associated with various communications jurisdiction zones, enterprise allowed types of secure communications security levels data, and owner data transfer policy data for various data types is obtained. Then when communication is desired between two resources residing in two different communications jurisdiction zones, the communications and data security policies for the two communications jurisdiction zones, the enterprise allowed types of secure communications security levels data, and the owner data transfer policy data are automatically analyzed to identify the appropriate communications channel including a secure communications security level satisfying the data security policies for the two communications jurisdiction zones, the enterprise allowed types of secure communications security levels data, and the owner data transfer policy data. In embodiment, the appropriate communications channel including the selected secure communications security level is automatically deployed to provide the desired communication capability and remain in compliance with communications and the data security policies of the communications jurisdiction zones involved, the enterprise allowed types of secure communications security levels data, and the owner data transfer policy data.

Consequently, using the method and system for automatically managing secure communications across multiple communications jurisdiction zones discussed herein, appropriate communications channels between resources in different communications jurisdiction zones is automatically, and transparently, provided in an efficient and effective manner.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for automatically managing secure communications across multiple communications jurisdiction zones includes identifying two or more communications jurisdiction zones from which, and/or to which, data may be transferred using one or more types of communications channels including one or more types of secure communications security levels. In one embodiment, communications and data security policy data for the identified communications jurisdiction zones is obtained that includes data indicating allowed types of secure communications security levels for the respective communications jurisdiction zones.

In one embodiment, data indicating a desired exchange of data between a first resource in a first communications jurisdiction zone and a second resource in a second communications jurisdiction zone is received/obtained. In one embodiment, the first communications jurisdiction zone policy data associated with the first communications jurisdiction zone and the second communications jurisdiction zone policy data associated with the second communications jurisdiction zone is automatically obtained from the communications and data security policy data.

In one embodiment, the data indicating the desired exchange of data is automatically analyzed to determine a required type of communications channel and then the first communications jurisdiction zone policy data and the second communications jurisdiction zone policy data are automatically analyzed to determine at least one allowed type of secure communications security level for the desired exchange of data that complies with both the first communications jurisdiction zone policy data and the second communications jurisdiction zone policy data.

In one embodiment, one of the at least one allowed type of secure communications security level is then selected and the required type of communications channel, including the selected allowed type of secure communications security level, is automatically established between the first resource and the second resource.

Figure 3:
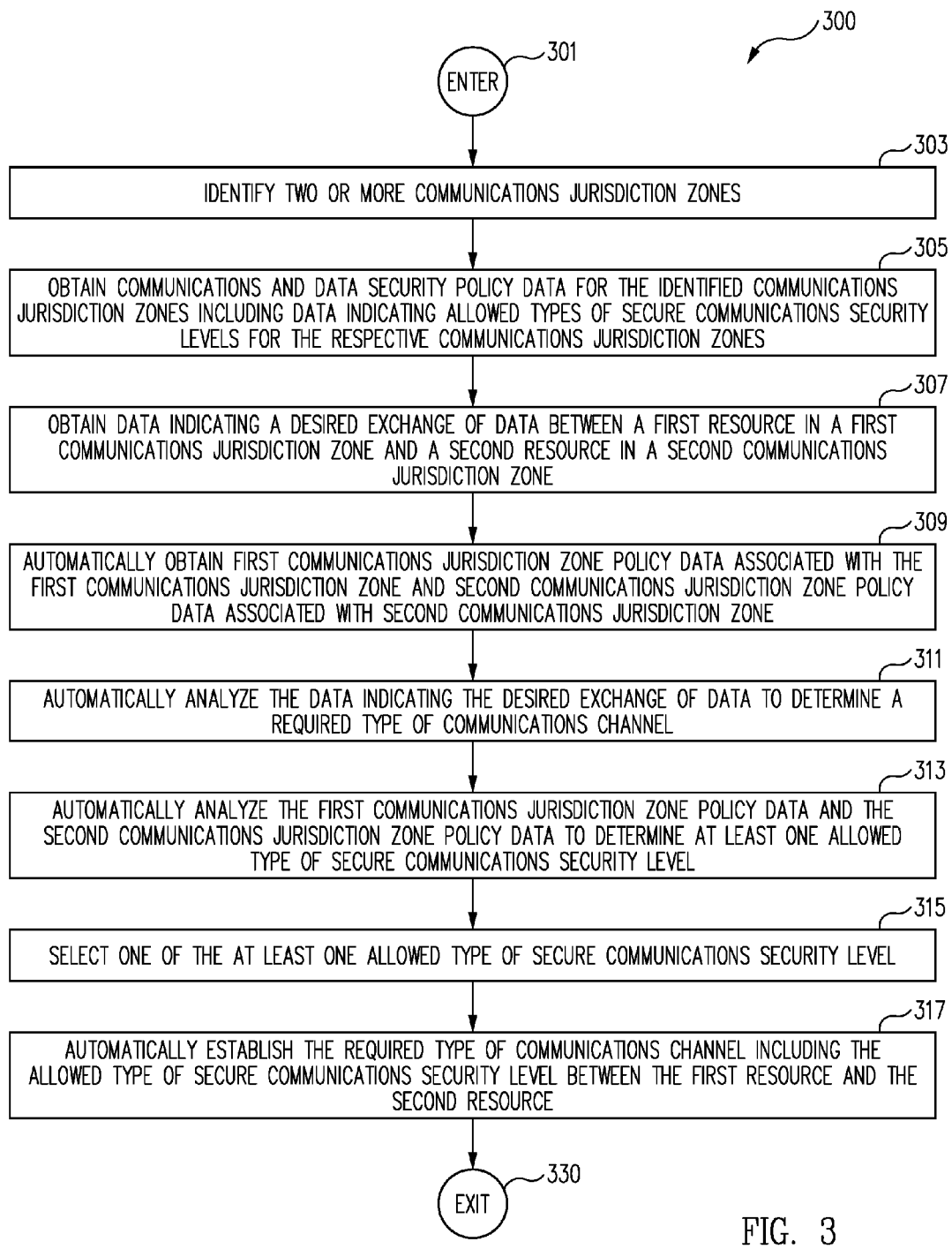
FIG. 3 is a flow chart depicting a process for automatically managing secure communications across multiple communications jurisdiction zones in accordance with one embodiment.

FIG. 3 is a flow chart of a process 300 for automatically managing secure communications across multiple communications jurisdiction zones in accordance with one embodiment. In one embodiment, process 300 for automatically managing secure communications across multiple communications jurisdiction zones begins at ENTER OPERATION 301 of FIG. 3 and process flow proceeds to IDENTIFY TWO OR MORE COMMUNICATIONS JURISDICTION ZONES OPERATION 303.

In one embodiment, at IDENTIFY TWO OR MORE COMMUNICATIONS JURISDICTION ZONES OPERATION 303 two or more communications jurisdiction zones from which, and/or to which, data may be transferred using one or more types of communications channels including one or more types of secure communications security levels are identified.

As noted above, herein communications jurisdiction zones can be, but are not limited to, physical geographical communications jurisdiction zones, such as geographical regions on the planet subject to specific communications and data security policies; political zones, such as countries or states subject to specific communications and data security policies; communications and data security zones, such as networks, clouds, or portions thereof, subject to specific communications and data security policies; resources and/or networks of resources subject to specific communications and data security policies; computing environments subject to specific communications and data security policies; and/or any other physically, politically, or virtually delineated communications jurisdiction zones subject to specific communications and data security policies, as discussed herein, and/or as known in the art at the time of filing, and/or as developed/become known after the time of filing.

In one embodiment, the two or more communications jurisdiction zones are identified at IDENTIFY TWO OR MORE COMMUNICATIONS JURISDICTION ZONES OPERATION 303 as communications jurisdiction zones likely to be the location of one or more resources within a cloud computing environment, or other decentralized computing system.

In one embodiment, once two or more communications jurisdiction zones from which, and/or to which, data may be transferred using one or more types of communications channels including one or more types of secure communications security levels are identified at IDENTIFY TWO OR MORE COMMUNICATIONS JURISDICTION ZONES OPERATION 303, process flow proceeds to OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 305.

In one embodiment, at OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 305 for each of the identified two or more communications jurisdiction zones of IDENTIFY TWO OR MORE COMMUNICATIONS JURISDICTION ZONES OPERATION 303, communications and data security policy data is obtained including data indicating allowed and/or required types of secure communications security levels for that identified communications jurisdiction zone.

In various embodiments, the communications and data security policy data can include, but is not limited to, communications and data security policy data associated with political entities such as local, state, national, or regional government agencies; communications and data security policy data associated with networks or sub networks of computing systems such as virtual private networks, local area networks, and wide area networks, and/or portions thereof; communications and data security policy data associated with cloud computing environments, or portions of cloud computing environments such as virtual private clouds, private clouds, or portions of a cloud computing environment implemented in different geographic regions; and/or any other communications policy data related to any communications jurisdiction zone, setting forth the allowed and/or required types of secure communications security levels that can, or must, be employed in that communications jurisdiction zone.

In one embodiment, the communications and data security policy data is stored and/or managed and updated through a policy manager.

In one embodiment, once communications and data security policy data is obtained for each of the identified communications jurisdiction zones including data indicating allowed and/or required types of secure communications security levels for that identified communications jurisdiction zone at OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 305, process flow proceeds to OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307.

In one embodiment, at OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307 data is obtained indicating, or requesting, a desired exchange of data between a first resource in a first communications jurisdiction zone and a second resource in a second communications jurisdiction zone.

Herein, the term "resource" refers to any software or hardware entity or component capable of transferring and/or receiving data. As one specific illustrative example, in one embodiment, one or more of the first or second resources of at OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307 includes a virtual asset implemented in a cloud computing environment.

As used herein, the term "virtual asset" includes any virtualized entity or resource, and/or a part of an actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In other embodiments, one or more of the first and second resources of at OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307 can include one or more components or systems deployed in a data center; one or more physical or virtual server computing systems; one or more physical or virtual workstations; one or more database systems or storage clusters; one or more switching systems; one or more routers; any hardware system; any communications systems; any form of proxy system; one or more gateway systems; one or more firewall systems; one or more load balancing systems; one or more applications and/or services; and/or any other software or hardware entity or entities capable of transmitting and/or receiving data as discussed herein, and/or as known in the art at the time of filing, and/or as developed/made available after the time of filing.

In one embodiment, the types of data desired to be transferred between resources in different communications jurisdiction zones at OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307 includes, but is not limited to, messages, such as email and text messages; files; images; secrets; and/or any other data and/or information type as discussed herein, and/or as known in the art at the time of filing, and/or as developed/made available after the time of filing.

In various embodiments, the data to be transferred between the first resource and the second resource of OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307 includes data type data indicating the type of data to be transferred and data owner data indicating the entity or party that is the source of the data to be transferred, and/or that "owns" the data to be transferred.

In one embodiment, at OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307 a determination is made that the first resource resides in, and/or is subject to the communications and data security policies, of a first communications jurisdiction zone using information contained in the IP address associated with the first resource, and/or any other mechanism as discussed herein, and/or as known in the art at the time of filing, and/or as developed/made available after the time of filing, for determining a communications jurisdiction zone associated with a resource or communications endpoint.

Similarly, in one embodiment, at OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307 a determination is made that the second resource resides in, and/or is subject to the communications and data security policies, of a second communications jurisdiction zone using information contained in the IP address associated with the second resource, and/or any other mechanism as discussed herein, and/or as known in the art at the time of filing, and/or as developed/made available after the time of filing, for determining a communications jurisdiction zone associated with a resource or communications endpoint.

In one embodiment, once data is obtained indicating, or requesting, a desired exchange of data between a first resource in a first communications jurisdiction zone and a second resource in a second communications jurisdiction zone at OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307, process flow proceeds to AUTOMATICALLY OBTAIN FIRST COMMUNICATIONS JURISDICTION ZONE POLICY DATA ASSOCIATED WITH THE FIRST COMMUNICATIONS JURISDICTION ZONE AND SECOND COMMUNICATIONS JURISDICTION ZONE POLICY DATA ASSOCIATED WITH SECOND COMMUNICATIONS JURISDICTION ZONE OPERATION 309.

In one embodiment, at AUTOMATICALLY OBTAIN FIRST COMMUNICATIONS JURISDICTION ZONE POLICY DATA ASSOCIATED WITH THE FIRST COMMUNICATIONS JURISDICTION ZONE AND SECOND COMMUNICATIONS JURISDICTION ZONE POLICY DATA ASSOCIATED WITH SECOND COMMUNICATIONS JURISDICTION ZONE OPERATION 309 the communications and data security policy data for the first communications jurisdiction zone and the communications and data security policy data for the second communications jurisdiction zone is obtained from the communications and data security policy data stored and/or managed and updated through a policy manager of OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 305.

In one embodiment, once the communications and data security policy data for the first communications jurisdiction zone and the communications and data security policy data for the second communications jurisdiction zone is obtained from the communications and data security policy data stored and/or managed and updated through a policy manager at AUTOMATICALLY OBTAIN FIRST COMMUNICATIONS JURISDICTION ZONE POLICY DATA ASSOCIATED WITH THE FIRST COMMUNICATIONS JURISDICTION ZONE AND SECOND COMMUNICATIONS JURISDICTION ZONE POLICY DATA ASSOCIATED WITH SECOND COMMUNICATIONS JURISDICTION ZONE OPERATION 309, process flow proceeds to AUTOMATICALLY ANALYZE THE DATA INDICATING THE DESIRED EXCHANGE OF DATA TO DETERMINE A REQUIRED TYPE OF COMMUNICATIONS CHANNEL OPERATION 311.

In one embodiment, at AUTOMATICALLY ANALYZE THE DATA INDICATING THE DESIRED EXCHANGE OF DATA TO DETERMINE A REQUIRED TYPE OF COMMUNICATIONS CHANNEL OPERATION 311 the data to be transferred between the first resource in the first communications jurisdiction zone and the second resource in the second communications jurisdiction zone is automatically analyzed to determine the type of data to be transferred.

As noted above, the types of data desired to be transferred can include, but are not limited to, messages, such as email and text messages; files; images; secrets; and/or any other data and/or information type as discussed herein, and/or as known in the art at the time of filing, and/or as developed/made available after the time of filing.

In various embodiments, the type of data to be transferred determines the type of communication channel to be established between the first resource in the first communications jurisdiction zone and the second resource in the second communications jurisdiction zone, i.e., the type and form of data to be transferred determines the secure communications protocol to be employed to provide a secure communications channel between the first resource and the second resource.

In various embodiments, the communications channels to be established can be, but are not limited to, a Secure Sockets Layer (SSL) communications channel; a Transport Layer Security (TLS) communications channel; a Simple Transportation Management Protocol (STMP) communications channel; a Simple Mail Transfer Protocol (SMTP) communications channel; a Spanning Tree Protocol (STP) communications channel; an Internet Control Message Protocol (ICMP) communications channel; and/or any secure communication protocol channel, as discussed herein, and/or as known in the art at the time of filing, and/or as developed after the time of filing, providing some form or level of secure communications security.

In one embodiment, once the data to be transferred between the first resource in the first communications jurisdiction zone and the second resource in the second communications jurisdiction zone is automatically analyzed to determine the type of data to be transferred at AUTOMATICALLY ANALYZE THE DATA INDICATING THE DESIRED EXCHANGE OF DATA TO DETERMINE A REQUIRED TYPE OF COMMUNICATIONS CHANNEL OPERATION 311, process flow proceeds to AUTOMATICALLY ANALYZE THE FIRST COMMUNICATIONS JURISDICTION ZONE POLICY DATA AND THE SECOND COMMUNICATIONS JURISDICTION ZONE POLICY DATA TO DETERMINE AT LEAST ONE ALLOWED TYPE OF SECURE COMMUNICATIONS SECURITY LEVEL OPERATION 313.

In one embodiment, once the type of data to be transferred is determined which, in turn, determines the required type of communications channel, i.e., the secure communications protocol to be employed, at AUTOMATICALLY ANALYZE THE DATA INDICATING THE DESIRED EXCHANGE OF DATA TO DETERMINE A REQUIRED TYPE OF COMMUNICATIONS CHANNEL OPERATION 311, the communications and data security policy data for the first communications jurisdiction zone and the communications and data security policy data for the second communications jurisdiction zone is automatically analyzed at AUTOMATICALLY ANALYZE THE FIRST COMMUNICATIONS JURISDICTION ZONE POLICY DATA AND THE SECOND COMMUNICATIONS JURISDICTION ZONE POLICY DATA TO DETERMINE AT LEAST ONE ALLOWED TYPE OF SECURE COMMUNICATIONS SECURITY LEVEL OPERATION 313 to determine at least one allowed type of secure communications security level for the desired exchange of data that complies with both the first communications jurisdictional zone policy data and the second communications jurisdictional zone policy data.

In various embodiments, the allowed type of secure communications security level for the desired exchange of data that complies with both the first communications jurisdictional zone policy data and the second communications jurisdictional zone policy data of AUTOMATICALLY ANALYZE THE FIRST COMMUNICATIONS JURISDICTION ZONE POLICY DATA AND THE SECOND COMMUNICATIONS JURISDICTION ZONE POLICY DATA TO DETERMINE AT LEAST ONE ALLOWED TYPE OF SECURE COMMUNICATIONS SECURITY LEVEL OPERATION 313 includes, but is not limited to, the type and/or length of encryption applied to the data to be transferred, and/or all communications and data transfer performed, using the required communications channel.

In other embodiments, other types of secure communications security level for the desired exchange of data that complies with both the first communications jurisdictional zone policy data and the second communications jurisdictional zone policy data are determined at AUTOMATICALLY ANALYZE THE FIRST COMMUNICATIONS JURISDICTION ZONE POLICY DATA AND THE SECOND COMMUNICATIONS JURISDICTION ZONE POLICY DATA TO DETERMINE AT LEAST ONE ALLOWED TYPE OF SECURE COMMUNICATIONS SECURITY LEVEL OPERATION 313, such as any secure communications security level as discussed herein, and/or as known in the art at the time of filing, and/or as developed/made available after the time of filing.

In one embodiment, once the communications and data security policy data for the first communications jurisdiction zone and the communications and data security policy data for the second communications jurisdiction zone is automatically analyzed to determine at least one allowed type of secure communications security level for the desired exchange of data that complies with both the first communications jurisdictional zone policy data and the second communications jurisdictional zone policy data at AUTOMATICALLY ANALYZE THE FIRST COMMUNICATIONS JURISDICTION ZONE POLICY DATA AND THE SECOND COMMUNICATIONS JURISDICTION ZONE POLICY DATA TO DETERMINE AT LEAST ONE ALLOWED TYPE OF SECURE COMMUNICATIONS SECURITY LEVEL OPERATION 313, process flow proceeds to SELECT ONE OF THE AT LEAST ONE ALLOWED TYPE OF SECURE COMMUNICATIONS SECURITY LEVEL OPERATION 315.

In one embodiment, once at least one allowed type of secure communications security level is identified that complies with both the first communications jurisdictional zone policy data and the second communications jurisdictional zone policy data at AUTOMATICALLY ANALYZE THE FIRST COMMUNICATIONS JURISDICTION ZONE POLICY DATA AND THE SECOND COMMUNICATIONS JURISDICTION ZONE POLICY DATA TO DETERMINE AT LEAST ONE ALLOWED TYPE OF SECURE COMMUNICATIONS SECURITY LEVEL OPERATION 313, one of the at least one allowed type of secure communications security level is selected at SELECT ONE OF THE AT LEAST ONE ALLOWED TYPE OF SECURE COMMUNICATIONS SECURITY LEVEL OPERATION 315.

In one embodiment, once one of the at least one allowed type of secure communications security level is selected at SELECT ONE OF THE AT LEAST ONE ALLOWED TYPE OF SECURE COMMUNICATIONS SECURITY LEVEL OPERATION 315, process flow proceeds AUTOMATICALLY ESTABLISH THE REQUIRED TYPE OF COMMUNICATIONS CHANNEL INCLUDING THE ALLOWED TYPE OF SECURE COMMUNICATIONS SECURITY LEVEL BETWEEN THE FIRST RESOURCE AND THE SECOND RESOURCE OPERATION 317.

In one embodiment, at AUTOMATICALLY ESTABLISH THE REQUIRED TYPE OF COMMUNICATIONS CHANNEL INCLUDING THE ALLOWED TYPE OF SECURE COMMUNICATIONS SECURITY LEVEL BETWEEN THE FIRST RESOURCE AND THE SECOND RESOURCE OPERATION 317 a communications channel of the required communications channel type of AUTOMATICALLY ANALYZE THE DATA INDICATING THE DESIRED EXCHANGE OF DATA TO DETERMINE A REQUIRED TYPE OF COMMUNICATIONS CHANNEL OPERATION 311, including the selected secure communications security level of AUTOMATICALLY ANALYZE THE FIRST COMMUNICATIONS JURISDICTION ZONE POLICY DATA AND THE SECOND COMMUNICATIONS JURISDICTION ZONE POLICY DATA TO DETERMINE AT LEAST ONE ALLOWED TYPE OF SECURE COMMUNICATIONS SECURITY LEVEL OPERATION 313, is automatically established, or implemented, between the first resource in the first communications jurisdiction zone and the second resource in the second communications jurisdiction zone of OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307.

In one embodiment, once a communications channel of the required communications channel type of AUTOMATICALLY ANALYZE THE DATA INDICATING THE DESIRED EXCHANGE OF DATA TO DETERMINE A REQUIRED TYPE OF COMMUNICATIONS CHANNEL OPERATION 311, including the selected secure communications security level of AUTOMATICALLY ANALYZE THE FIRST COMMUNICATIONS JURISDICTION ZONE POLICY DATA AND THE SECOND COMMUNICATIONS JURISDICTION ZONE POLICY DATA TO DETERMINE AT LEAST ONE ALLOWED TYPE OF SECURE COMMUNICATIONS SECURITY LEVEL OPERATION 313, is automatically established, or implemented, between the first resource in the first communications jurisdiction zone and the second resource in the second communications jurisdiction zone of OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307 at AUTOMATICALLY ESTABLISH THE REQUIRED TYPE OF COMMUNICATIONS CHANNEL INCLUDING THE ALLOWED TYPE OF SECURE COMMUNICATIONS SECURITY LEVEL BETWEEN THE FIRST RESOURCE AND THE SECOND RESOURCE OPERATION 317, process flow proceeds to EXIT OPERATION 330.

In one embodiment, at EXIT OPERATION 330 process 300 for automatically managing secure communications across multiple communications jurisdiction zones is exited to await new data.

Using process 300 for automatically managing secure communications across multiple communications jurisdiction zones discussed above, communications and data security policies associated with various communications jurisdiction zones is obtained. Then when communication is desired between two resources residing in two different communications jurisdiction zones, the communications and data security policies for the two communications jurisdiction zones are automatically analyzed to identify the appropriate communications channel including a secure communications security level satisfying both the data security policies for the two communications jurisdiction zones. In one embodiment, the appropriate communications channel including the selected secure communications security level is automatically deployed to provide the desired communication capability and remain in compliance with communications and the data security policies of the communications jurisdiction zones involved.

Consequently, using process 300 for automatically managing secure communications across multiple communications jurisdiction zones, appropriate communications channels between resources in different communications jurisdiction zones is automatically, and transparently, provided in an efficient and effective manner.

In various other embodiments, in addition to the first communications jurisdiction zone policy data and the second communications jurisdiction zone policy data, enterprise allowed types of secure communications security levels data is also considered and the first communications jurisdiction zone policy data, the second communications jurisdiction zone policy data, and the enterprise allowed types of secure communications security level data are automatically analyzed to determine at least one allowed type of secure communications security level for the desired exchange of data that complies with each of the first communications jurisdiction zone policy data, the second communications jurisdiction zone policy data, and the enterprise allowed types of secure communications security level data.

Figure 4:
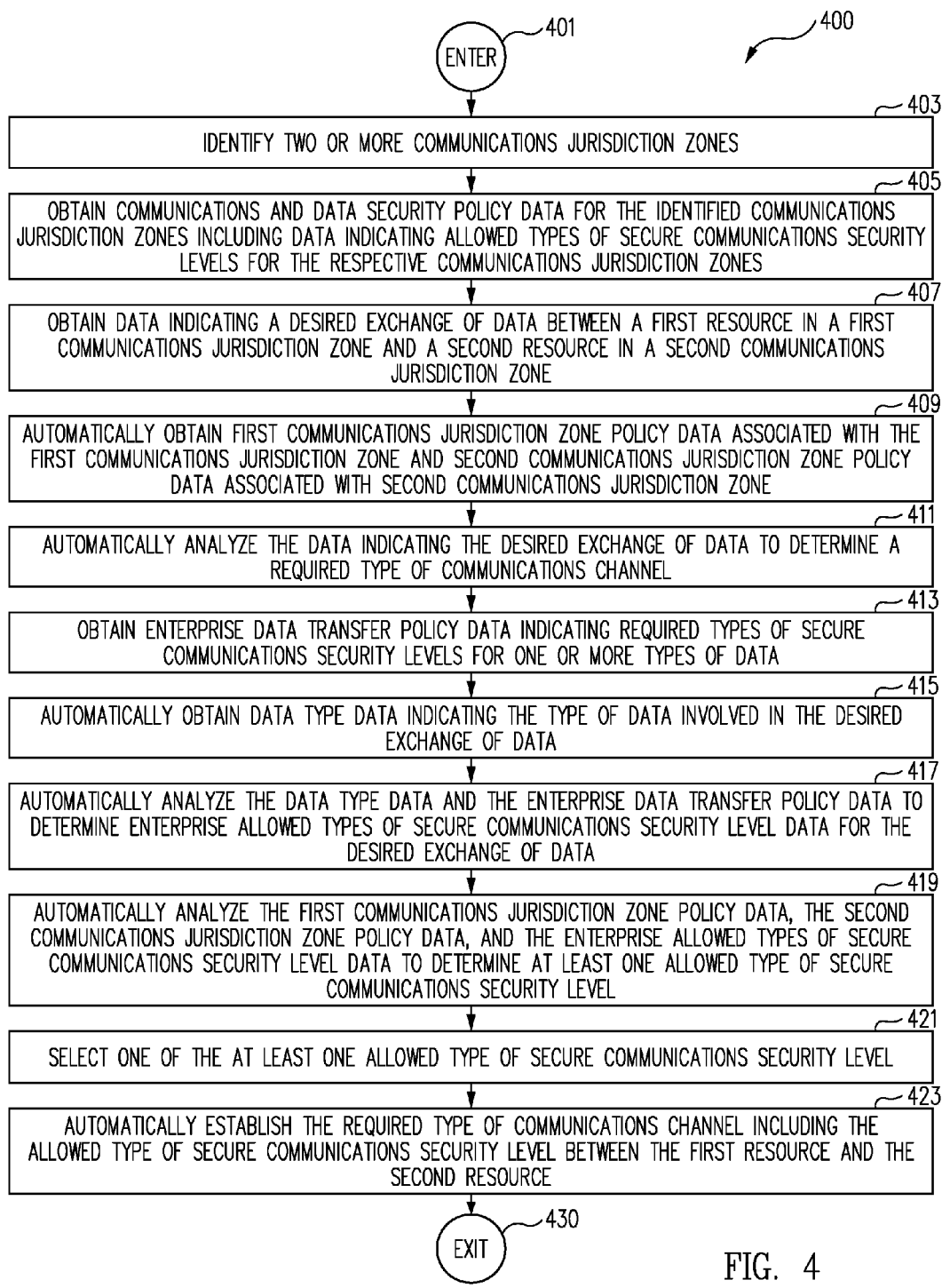
FIG. 4 is a flow chart depicting a process for automatically managing secure communications across multiple communications jurisdiction zones in accordance with one embodiment.

FIG. 4 is a flow chart of a process 400 for automatically managing secure communications across multiple communications jurisdiction zones in accordance with one embodiment. In one embodiment, process 400 for automatically managing secure communications across multiple communications jurisdiction zones begins at ENTER OPERATION 401 of FIG. 4 and process flow proceeds to IDENTIFY TWO OR MORE COMMUNICATIONS JURISDICTION ZONES OPERATION 403.

In various embodiments, IDENTIFY TWO OR MORE COMMUNICATIONS JURISDICTION ZONES OPERATION 403; OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 405; OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 407; AUTOMATICALLY OBTAIN FIRST COMMUNICATIONS JURISDICTION ZONE POLICY DATA ASSOCIATED WITH THE FIRST COMMUNICATIONS JURISDICTION ZONE AND SECOND COMMUNICATIONS JURISDICTION ZONE POLICY DATA ASSOCIATED WITH SECOND COMMUNICATIONS JURISDICTION ZONE OPERATION 409; and AUTOMATICALLY ANALYZE THE DATA INDICATING THE DESIRED EXCHANGE OF DATA TO DETERMINE A REQUIRED TYPE OF COMMUNICATIONS CHANNEL OPERATION 411 of process 400 for automatically managing secure communications across multiple communications jurisdiction zones are substantially identical to IDENTIFY TWO OR MORE COMMUNICATIONS JURISDICTION ZONES OPERATION 303; OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 305; OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307; AUTOMATICALLY OBTAIN FIRST COMMUNICATIONS JURISDICTION ZONE POLICY DATA ASSOCIATED WITH THE FIRST COMMUNICATIONS JURISDICTION ZONE AND SECOND COMMUNICATIONS JURISDICTION ZONE POLICY DATA ASSOCIATED WITH SECOND COMMUNICATIONS JURISDICTION ZONE OPERATION 309; and AUTOMATICALLY ANALYZE THE DATA INDICATING THE DESIRED EXCHANGE OF DATA TO DETERMINE A REQUIRED TYPE OF COMMUNICATIONS CHANNEL OPERATION 311 of process 300 for automatically managing secure communications across multiple communications jurisdiction zones discussed above, consequently, the reader is referred to the discussion above for a more detailed discussion of IDENTIFY TWO OR MORE COMMUNICATIONS JURISDICTION ZONES OPERATION 403; OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 405; OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 407; AUTOMATICALLY OBTAIN FIRST COMMUNICATIONS JURISDICTION ZONE POLICY DATA ASSOCIATED WITH THE FIRST COMMUNICATIONS JURISDICTION ZONE AND SECOND COMMUNICATIONS JURISDICTION ZONE POLICY DATA ASSOCIATED WITH SECOND COMMUNICATIONS JURISDICTION ZONE OPERATION 409; and AUTOMATICALLY ANALYZE THE DATA INDICATING THE DESIRED EXCHANGE OF DATA TO DETERMINE A REQUIRED TYPE OF COMMUNICATIONS CHANNEL OPERATION 411.

In one embodiment, once the data to be transferred between the first resource in the first communications jurisdiction zone and the second resource in the second communications jurisdiction zone is automatically analyzed to determine the type of data to be transferred at AUTOMATICALLY ANALYZE THE DATA INDICATING THE DESIRED EXCHANGE OF DATA TO DETERMINE A REQUIRED TYPE OF COMMUNICATIONS CHANNEL OPERATION 411, process flow proceeds to OBTAIN ENTERPRISE DATA TRANSFER POLICY DATA INDICATING REQUIRED TYPES OF SECURE COMMUNICATIONS SECURITY LEVELS FOR ONE OR MORE TYPES OF DATA OPERATION 413.

In one embodiment, at OBTAIN ENTERPRISE DATA TRANSFER POLICY DATA INDICATING REQUIRED TYPES OF SECURE COMMUNICATIONS SECURITY LEVELS FOR ONE OR MORE TYPES OF DATA OPERATION 413 enterprise data transfer policy data including data indicating required types of secure communications security levels for one or more types of data is obtained.

In one embodiment, enterprise data transfer policy data is obtained at OBTAIN ENTERPRISE DATA TRANSFER POLICY DATA INDICATING REQUIRED TYPES OF SECURE COMMUNICATIONS SECURITY LEVELS FOR ONE OR MORE TYPES OF DATA OPERATION 413 from an enterprise data transfer policy manager that includes enterprise data transfer policy data for each data type.

In one embodiment, the enterprise data transfer policy data including data indicating required types of secure communications security levels for one or more types of data of OBTAIN ENTERPRISE DATA TRANSFER POLICY DATA INDICATING REQUIRED TYPES OF SECURE COMMUNICATIONS SECURITY LEVELS FOR ONE OR MORE TYPES OF DATA OPERATION 413 is determined based, at least in part, on one or more data classification factors including, but not limited to, a determination as to the sensitivity of the data to be transferred as determined by the enterprise charged with protecting the data; a determination as to the sensitivity of the data to be transferred as determined by one or more regulations and/or regulatory agencies; a determination as to the sensitivity of the data to be transferred as determined based on the need to protect the identity and personal information of the owners and/or sources of the data to be protected; a determination of the risk associated with the data to be transferred; a determination of the vulnerability associated with the data to be transferred; a determination of the commercial value of the data to be transferred; a determination of the strategic value of the data to be transferred; a determination of the entertainment value of the data to be transferred; and/or any other data classification factors as discussed herein, and/or as known in the art at the time of filing, and/or as developed after the time of filing.

In one embodiment, once enterprise data transfer policy data including data indicating required types of secure communications security levels for one or more types of data is obtained at OBTAIN ENTERPRISE DATA TRANSFER POLICY DATA INDICATING REQUIRED TYPES OF SECURE COMMUNICATIONS SECURITY LEVELS FOR ONE OR MORE TYPES OF DATA OPERATION 413, process flow proceeds to AUTOMATICALLY OBTAIN DATA TYPE DATA INDICATING THE TYPE OF DATA INVOLVED IN THE DESIRED EXCHANGE OF DATA OPERATION 415

In one embodiment, at AUTOMATICALLY OBTAIN DATA TYPE DATA INDICATING THE TYPE OF DATA INVOLVED IN THE DESIRED EXCHANGE OF DATA OPERATION 415 data type data indicating the type of data involved in the desired exchange of data is obtained and automatically analyzed to determine the type of data to be exchanged.

In one embodiment, once data type data indicating the type of data involved in the desired exchange of data is obtained and automatically analyzed to determine the type of data to be exchanged at AUTOMATICALLY OBTAIN DATA TYPE DATA INDICATING THE TYPE OF DATA INVOLVED IN THE DESIRED EXCHANGE OF DATA OPERATION 415, process flow proceeds to AUTOMATICALLY ANALYZE THE DATA TYPE DATA AND THE ENTERPRISE DATA TRANSFER POLICY DATA TO DETERMINE ENTERPRISE ALLOWED TYPES OF SECURE COMMUNICATIONS SECURITY LEVEL DATA FOR THE DESIRED EXCHANGE OF DATA OPERATION 417.

In one embodiment, at AUTOMATICALLY ANALYZE THE DATA TYPE DATA AND THE ENTERPRISE DATA TRANSFER POLICY DATA TO DETERMINE ENTERPRISE ALLOWED TYPES OF SECURE COMMUNICATIONS SECURITY LEVEL DATA FOR THE DESIRED EXCHANGE OF DATA OPERATION 417 the enterprise data transfer policy data for the determined data type is automatically obtained and analyzed to generate enterprise allowed types of secure communications security levels data.

In one embodiment, once the enterprise data transfer policy data for the determined data type is automatically obtained and analyzed to generate enterprise allowed types of secure communications security levels data at AUTOMATICALLY ANALYZE THE DATA TYPE DATA AND THE ENTERPRISE DATA TRANSFER POLICY DATA TO DETERMINE ENTERPRISE ALLOWED TYPES OF SECURE COMMUNICATIONS SECURITY LEVEL DATA FOR THE DESIRED EXCHANGE OF DATA OPERATION 417, process flow proceeds to AUTOMATICALLY ANALYZE THE FIRST COMMUNICATIONS JURISDICTION ZONE POLICY DATA, THE SECOND COMMUNICATIONS JURISDICTION ZONE POLICY DATA, AND THE ENTERPRISE ALLOWED TYPES OF SECURE COMMUNICATIONS SECURITY LEVEL DATA TO DETERMINE AT LEAST ONE ALLOWED TYPE OF SECURE COMMUNICATIONS SECURITY LEVEL OPERATION 419.

In one embodiment, at AUTOMATICALLY ANALYZE THE FIRST COMMUNICATIONS JURISDICTION ZONE POLICY DATA, THE SECOND COMMUNICATIONS JURISDICTION ZONE POLICY DATA, AND THE ENTERPRISE ALLOWED TYPES OF SECURE COMMUNICATIONS SECURITY LEVEL DATA TO DETERMINE AT LEAST ONE ALLOWED TYPE OF SECURE COMMUNICATIONS SECURITY LEVEL OPERATION 419 the communications and data security policy data for the first communications jurisdiction zone, the communications and data security policy data for the second communications jurisdiction zone, and the enterprise allowed types of secure communications security levels data, is automatically analyzed to determine at least one allowed type of secure communications security level for the desired exchange of data that complies with the first communications jurisdictional zone policy data, the second communications jurisdictional zone policy data, and the enterprise allowed types of secure communications security levels data.

In various embodiments, the allowed type of secure communications security level for the desired exchange of data that complies with the first communications jurisdictional zone policy data, the second communications jurisdictional zone policy data, and the enterprise allowed types of secure communications security levels data includes, but is not limited to, the type and/or length of encryption applied to the data to be transferred, and/or all communications and data transfer performed, using the required communications channel.

In other embodiments, other types of secure communications security for the desired exchange of data that complies with the first communications jurisdictional zone policy data, the second communications jurisdictional zone policy data, and the enterprise allowed types of secure communications security levels data, are determined, such as any secure communications security level as discussed herein, and/or as known in the art at the time of filing, and/or as developed/made available after the time of filing.

In one embodiment, once the communications and data security policy data for the first communications jurisdiction zone, the communications and data security policy data for the second communications jurisdiction zone, and the enterprise allowed types of secure communications security levels data, is automatically analyzed to determine at least one allowed type of secure communications security level for the desired exchange of data that complies with the first communications jurisdictional zone policy data, the second communications jurisdictional zone policy data, and the enterprise allowed types of secure communications security levels data at AUTOMATICALLY ANALYZE THE FIRST COMMUNICATIONS JURISDICTION ZONE POLICY DATA, THE SECOND COMMUNICATIONS JURISDICTION ZONE POLICY DATA, AND THE ENTERPRISE ALLOWED TYPES OF SECURE COMMUNICATIONS SECURITY LEVEL DATA TO DETERMINE AT LEAST ONE ALLOWED TYPE OF SECURE COMMUNICATIONS SECURITY LEVEL OPERATION 419, process flow proceeds to SELECT ONE OF THE AT LEAST ONE ALLOWED TYPE OF SECURE COMMUNICATIONS SECURITY LEVEL OPERATION 421.

In one embodiment, at SELECT ONE OF THE AT LEAST ONE ALLOWED TYPE OF SECURE COMMUNICATIONS SECURITY LEVEL OPERATION 421 one of the at least one allowed type of secure communications security level of AUTOMATICALLY ANALYZE THE FIRST COMMUNICATIONS JURISDICTION ZONE POLICY DATA, THE SECOND COMMUNICATIONS JURISDICTION ZONE POLICY DATA, AND THE ENTERPRISE ALLOWED TYPES OF SECURE COMMUNICATIONS SECURITY LEVEL DATA TO DETERMINE AT LEAST ONE ALLOWED TYPE OF SECURE COMMUNICATIONS SECURITY LEVEL OPERATION 419 is selected.

In one embodiment, once one of the at least one allowed type of secure communications security level is selected at SELECT ONE OF THE AT LEAST ONE ALLOWED TYPE OF SECURE COMMUNICATIONS SECURITY LEVEL OPERATION 421, process flow proceeds to AUTOMATICALLY ESTABLISH THE REQUIRED TYPE OF COMMUNICATIONS CHANNEL INCLUDING THE ALLOWED TYPE OF SECURE COMMUNICATIONS SECURITY LEVEL BETWEEN THE FIRST RESOURCE AND THE SECOND RESOURCE OPERATION 423.

In one embodiment, at AUTOMATICALLY ESTABLISH THE REQUIRED TYPE OF COMMUNICATIONS CHANNEL INCLUDING THE ALLOWED TYPE OF SECURE COMMUNICATIONS SECURITY LEVEL BETWEEN THE FIRST RESOURCE AND THE SECOND RESOURCE OPERATION 423 a communications channel of the required communications channel type including the selected secure communications security level is automatically established, or implemented, between the first resource in the first communications jurisdiction zone and the second resource in the second communications jurisdiction zone.

In one embodiment, once a communications channel of the required communications channel type including the selected secure communications security level is automatically established, or implemented, between the first resource in the first communications jurisdiction zone and the second resource in the second communications jurisdiction zone at AUTOMATICALLY ESTABLISH THE REQUIRED TYPE OF COMMUNICATIONS CHANNEL INCLUDING THE ALLOWED TYPE OF SECURE COMMUNICATIONS SECURITY LEVEL BETWEEN THE FIRST RESOURCE AND THE SECOND RESOURCE OPERATION 423, process flow proceeds to EXIT OPERATION 430.

In one embodiment, at EXIT OPERATION 430 process 400 for automatically managing secure communications across multiple communications jurisdiction zones is exited to await new data.

Using the process 400 for automatically managing secure communications across multiple communications jurisdiction zones discussed above, communications and data security policies associated with various communications jurisdiction zones and enterprise data transfer policy data for various data types is obtained. Then when communication is desired between two resources residing in two different communications jurisdiction zones, the communications and data security policies for the two communications jurisdiction zones and the enterprise data transfer policy data are automatically analyzed to identify the appropriate communications channel including a secure communications security level satisfying the data security policies for the two communications jurisdiction zones and the enterprise data transfer policy data. In one embodiment, the appropriate communications channel including the selected secure communications security level is automatically deployed to provide the desired communication capability and remain in compliance with communications and the data security policies of the communications jurisdiction zones involved and the enterprise data transfer policy data.

Consequently, using process 400 for automatically managing secure communications across multiple communications jurisdiction zones, appropriate communications channels between resources in different communications jurisdiction zones is automatically, and transparently, provided in an efficient and effective manner.

In various other embodiments, in addition to the first communications jurisdiction zone policy data and the second communications jurisdiction zone policy data, owner allowed types of secure communications security levels data is also considered and the first communications jurisdiction zone policy data, the second communications jurisdiction zone policy data, and the owner allowed types of secure communications security level data, are automatically analyzed to determine at least one allowed type of secure communications security level for the desired exchange of data that complies with each of the first communications jurisdiction zone policy data, the second communications jurisdiction zone policy data, and the owner allowed types of secure communications security level data.

Figure 5:
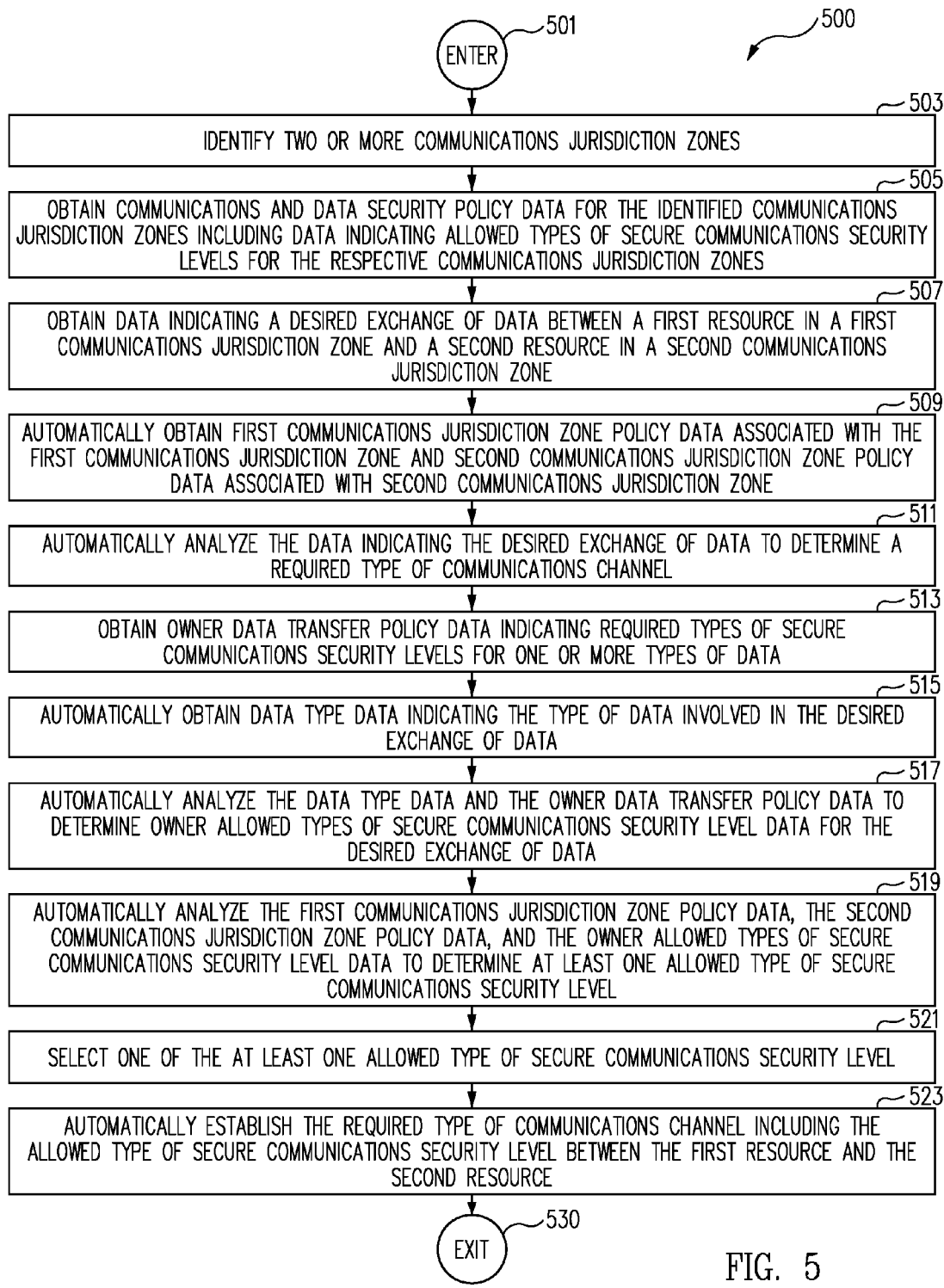
FIG. 5 is a flow chart depicting a process for automatically managing secure communications across multiple communications jurisdiction zones in accordance with one embodiment.

FIG. 5 is a flow chart of a process 500 for automatically managing secure communications across multiple communications jurisdiction zones in accordance with one embodiment. In one embodiment, process 500 for automatically managing secure communications across multiple communications jurisdiction zones begins at ENTER OPERATION 501 of FIG. 5 and process flow proceeds to IDENTIFY TWO OR MORE COMMUNICATIONS JURISDICTION ZONES OPERATION 503.

In various embodiments, IDENTIFY TWO OR MORE COMMUNICATIONS JURISDICTION ZONES OPERATION 503; OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 505; OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 507; AUTOMATICALLY OBTAIN FIRST COMMUNICATIONS JURISDICTION ZONE POLICY DATA ASSOCIATED WITH THE FIRST COMMUNICATIONS JURISDICTION ZONE AND SECOND COMMUNICATIONS JURISDICTION ZONE POLICY DATA ASSOCIATED WITH SECOND COMMUNICATIONS JURISDICTION ZONE OPERATION 509; and AUTOMATICALLY ANALYZE THE DATA INDICATING THE DESIRED EXCHANGE OF DATA TO DETERMINE A REQUIRED TYPE OF COMMUNICATIONS CHANNEL OPERATION 511 of process 500 for automatically managing secure communications across multiple communications jurisdiction zones are substantially identical to IDENTIFY TWO OR MORE COMMUNICATIONS JURISDICTION ZONES OPERATION 303; OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 305; OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 307; AUTOMATICALLY OBTAIN FIRST COMMUNICATIONS JURISDICTION ZONE POLICY DATA ASSOCIATED WITH THE FIRST COMMUNICATIONS JURISDICTION ZONE AND SECOND COMMUNICATIONS JURISDICTION ZONE POLICY DATA ASSOCIATED WITH SECOND COMMUNICATIONS JURISDICTION ZONE OPERATION 309; and AUTOMATICALLY ANALYZE THE DATA INDICATING THE DESIRED EXCHANGE OF DATA TO DETERMINE A REQUIRED TYPE OF COMMUNICATIONS CHANNEL OPERATION 311 of process 300 for automatically managing secure communications across multiple communications jurisdiction zones discussed above, consequently, the reader is referred to the discussion above for a more detailed discussion of IDENTIFY TWO OR MORE COMMUNICATIONS JURISDICTION ZONES OPERATION 503; OBTAIN COMMUNICATIONS AND DATA SECURITY POLICY DATA FOR THE IDENTIFIED COMMUNICATIONS JURISDICTION ZONES INCLUDING DATA INDICATING ALLOWED TYPES OF SECURE COMMUNICATIONS SECURITY LEVELS FOR THE RESPECTIVE COMMUNICATIONS JURISDICTION ZONES OPERATION 505; OBTAIN DATA INDICATING A DESIRED EXCHANGE OF DATA BETWEEN A FIRST RESOURCE IN A FIRST COMMUNICATIONS JURISDICTION ZONE AND A SECOND RESOURCE IN A SECOND COMMUNICATIONS JURISDICTION ZONE OPERATION 507; AUTOMATICALLY OBTAIN FIRST COMMUNICATIONS JURISDICTION ZONE POLICY DATA ASSOCIATED WITH THE FIRST COMMUNICATIONS JURISDICTION ZONE AND SECOND COMMUNICATIONS JURISDICTION ZONE POLICY DATA ASSOCIATED WITH SECOND COMMUNICATIONS JURISDICTION ZONE OPERATION 509; and AUTOMATICALLY ANALYZE THE DATA INDICATING THE DESIRED EXCHANGE OF DATA TO DETERMINE A REQUIRED TYPE OF COMMUNICATIONS CHANNEL OPERATION 511.

In one embodiment, once the data to be transferred between the first resource in the first communications jurisdiction zone and the second resource in the second communications jurisdiction zone is automatically analyzed to determine the type of data to be transferred at AUTOMATICALLY ANALYZE THE DATA INDICATING THE DESIRED EXCHANGE OF DATA TO DETERMINE A REQUIRED TYPE OF COMMUNICATIONS CHANNEL OPERATION 511, process flow proceeds to OBTAIN OWNER DATA TRANSFER POLICY DATA INDICATING REQUIRED TYPES OF SECURE COMMUNICATIONS SECURITY LEVELS FOR ONE OR MORE TYPES OF DATA OPERATION 513.

In one embodiment, at OBTAIN OWNER DATA TRANSFER POLICY DATA INDICATING REQUIRED TYPES OF SECURE COMMUNICATIONS SECURITY LEVELS FOR ONE OR MORE TYPES OF DATA OPERATION 513 owner data transfer policy data including data indicating required types of secure communications security levels for one or more types of data is obtained.

In one embodiment, owner data transfer policy data is obtained at OBTAIN OWNER DATA TRANSFER POLICY DATA INDICATING REQUIRED TYPES OF SECURE COMMUNICATIONS SECURITY LEVELS FOR ONE OR MORE TYPES OF DATA OPERATION 513 from an owner data transfer policy manager that includes owner data transfer policy data for each data type.

In one embodiment, once owner data transfer policy data including data indicating required types of secure communications security levels for one or more types of data is obtained at OBTAIN OWNER DATA TRANSFER POLICY DATA INDICATING REQUIRED TYPES OF SECURE COMMUNICATIONS SECURITY LEVELS FOR ONE OR MORE TYPES OF DATA OPERATION 513, process flow proceeds to AUTOMATICALLY OBTAIN DATA TYPE DATA INDICATING THE TYPE OF DATA INVOLVED IN THE DESIRED EXCHANGE OF DATA OPERATION 515

In one embodiment, at AUTOMATICALLY OBTAIN DATA TYPE DATA INDICATING THE TYPE OF DATA INVOLVED IN THE DESIRED EXCHANGE OF DATA OPERATION 515 data type data indicating the type of data involved in the desired exchange of data is obtained and automatically analyzed to determine the type of data to be exchanged.

In one embodiment, once data type data indicating the type of data involved in the desired exchange of data is obtained and automatically analyzed to determine the type of data to be exchanged at AUTOMATICALLY OBTAIN DATA TYPE DATA INDICATING THE TYPE OF DATA INVOLVED IN THE DESIRED EXCHANGE OF DATA OPERATION 515, process flow proceeds to AUTOMATICALLY ANALYZE THE DATA TYPE DATA AND THE OWNER DATA TRANSFER POLICY DATA TO DETERMINE OWNER ALLOWED TYPES OF SECURE COMMUNICATIONS SECURITY LEVEL DATA FOR THE DESIRED EXCHANGE OF DATA OPERATION 517.

In one embodiment, at AUTOMATICALLY ANALYZE THE DATA TYPE DATA AND THE OWNER DATA TRANSFER POLICY DATA TO DETERMINE OWNER ALLOWED TYPES OF SECURE COMMUNICATIONS SECURITY LEVEL DATA FOR THE DESIRED EXCHANGE OF DATA OPERATION 517 the owner data transfer policy data for the determined data type is automatically obtained and analyzed to generate owner allowed types of secure communications security levels data.

In one embodiment, once the owner data transfer policy data for the determined data type is automatically obtained and analyzed to generate owner allowed types of secure communications security levels data at AUTOMATICALLY ANALYZE THE DATA TYPE DATA AND THE OWNER DATA TRANSFER POLICY DATA TO DETERMINE OWNER ALLOWED TYPES OF SECURE COMMUNICATIONS SECURITY LEVEL DATA FOR THE DESIRED EXCHANGE OF DATA OPERATION 517, process flow proceeds to AUTOMATICALLY ANALYZE THE FIRST COMMUNICATIONS JURISDICTION ZONE POLICY DATA, THE SECOND COMMUNICATIONS JURISDICTION ZONE POLICY DATA, AND THE OWNER ALLOWED TYPES OF SECURE COMMUNICATIONS SECURITY LEVEL DATA TO DETERMINE AT LEAST ONE ALLOWED TYPE OF SECURE COMMUNICATIONS SECURITY LEVEL OPERATION 519.

In one embodiment, at AUTOMATICALLY ANALYZE THE FIRST COMMUNICATIONS JURISDICTION ZONE POLICY DATA, THE SECOND COMMUNICATIONS JURISDICTION ZONE POLICY DATA, AND THE OWNER ALLOWED TYPES OF SECURE COMMUNICATIONS SECURITY LEVEL DATA TO DETERMINE AT LEAST ONE ALLOWED TYPE OF SECURE COMMUNICATIONS SECURITY LEVEL OPERATION 519 the communications and data security policy data for the first communications jurisdiction zone, the communications and data security policy data for the second communications jurisdiction zone, and the owner allowed types of secure communications security levels data, is automatically analyzed to determine at least one allowed type of secure communications security level for the desired exchange of data that complies with the first communications jurisdictional zone policy data, the second communications jurisdictional zone policy data, and the owner allowed types of secure communications security levels data.

In various embodiments, the allowed type of secure communications security level for the desired exchange of data that complies with the first communications jurisdictional zone policy data, the second communications jurisdictional zone policy data, and the owner allowed types of secure communications security levels data includes, but is not limited to, the type and/or length of encryption applied to the data to be transferred, and/or all communications and data transfer performed, using the required communications channel.

In other embodiments, other types of secure communications security for the desired exchange of data that complies with the first communications jurisdictional zone policy data, the second communications jurisdictional zone policy data, and the owner allowed types of secure communications security levels data, are determined, such as any secure communications security level as discussed herein, and/or as known in the art at the time of filing, and/or as developed/made available after the time of filing.

In one embodiment, once the communications and data security policy data for the first communications jurisdiction zone, the communications and data security policy data for the second communications jurisdiction zone, and the owner allowed types of secure communications security levels data, is automatically analyzed to determine at least one allowed type of secure communications security level for the desired exchange of data that complies with the first communications jurisdictional zone policy data, the second communications jurisdictional zone policy data, and the owner allowed types of secure communications security levels data at AUTOMATICALLY ANALYZE THE FIRST COMMUNICATIONS JURISDICTION ZONE POLICY DATA, THE SECOND COMMUNICATIONS JURISDICTION ZONE POLICY DATA, AND THE OWNER ALLOWED TYPES OF SECURE COMMUNICATIONS SECURITY LEVEL DATA TO DETERMINE AT LEAST ONE ALLOWED TYPE OF SECURE COMMUNICATIONS SECURITY LEVEL OPERATION 519, process flow proceeds to SELECT ONE OF THE AT LEAST ONE ALLOWED TYPE OF SECURE COMMUNICATIONS SECURITY LEVEL OPERATION 521.

In one embodiment, at SELECT ONE OF THE AT LEAST ONE ALLOWED TYPE OF SECURE COMMUNICATIONS SECURITY LEVEL OPERATION 521 one of the at least one allowed type of secure communications security level of AUTOMATICALLY ANALYZE THE FIRST COMMUNICATIONS JURISDICTION ZONE POLICY DATA, THE SECOND COMMUNICATIONS JURISDICTION ZONE POLICY DATA, AND THE OWNER ALLOWED TYPES OF SECURE COMMUNICATIONS SECURITY LEVEL DATA TO DETERMINE AT LEAST ONE ALLOWED TYPE OF SECURE COMMUNICATIONS SECURITY LEVEL OPERATION 519 is selected.

In one embodiment, once one of the at least one allowed type of secure communications security level is selected at SELECT ONE OF THE AT LEAST ONE ALLOWED TYPE OF SECURE COMMUNICATIONS SECURITY LEVEL OPERATION 521, process flow proceeds to AUTOMATICALLY ESTABLISH THE REQUIRED TYPE OF COMMUNICATIONS CHANNEL INCLUDING THE ALLOWED TYPE OF SECURE COMMUNICATIONS SECURITY LEVEL BETWEEN THE FIRST RESOURCE AND THE SECOND RESOURCE OPERATION 523.

In one embodiment, at AUTOMATICALLY ESTABLISH THE REQUIRED TYPE OF COMMUNICATIONS CHANNEL INCLUDING THE ALLOWED TYPE OF SECURE COMMUNICATIONS SECURITY LEVEL BETWEEN THE FIRST RESOURCE AND THE SECOND RESOURCE OPERATION 523 a communications channel of the required communications channel type including the selected secure communications security level is automatically established, or implemented, between the first resource in the first communications jurisdiction zone and the second resource in the second communications jurisdiction zone.

In one embodiment, once a communications channel of the required communications channel type including the selected secure communications security level is automatically established, or implemented, between the first resource in the first communications jurisdiction zone and the second resource in the second communications jurisdiction zone at AUTOMATICALLY ESTABLISH THE REQUIRED TYPE OF COMMUNICATIONS CHANNEL INCLUDING THE ALLOWED TYPE OF SECURE COMMUNICATIONS SECURITY LEVEL BETWEEN THE FIRST RESOURCE AND THE SECOND RESOURCE OPERATION 523, process flow proceeds to EXIT OPERATION 530.

In one embodiment, at EXIT OPERATION 530 process 500 for automatically managing secure communications across multiple communications jurisdiction zones is exited to await new data.

Using the process 500 for automatically managing secure communications across multiple communications jurisdiction zones discussed above, communications and data security policies associated with various communications jurisdiction zones and owner data transfer policy data for various data types is obtained. Then when communication is desired between two resources residing in two different communications jurisdiction zones, the communications and data security policies for the two communications jurisdiction zones and the owner data transfer policy data are automatically analyzed to identify the appropriate communications channel including a secure communications security level satisfying the data security policies for the two communications jurisdiction zones and the owner data transfer policy data. In one embodiment, the appropriate communications channel including the selected secure communications security level is automatically deployed to provide the desired communication capability and remain in compliance with communications and the data security policies of the communications jurisdiction zones involved and the owner data transfer policy data.

Consequently, using process 500 for automatically managing secure communications across multiple communications jurisdiction zones, appropriate communications channels between resources in different communications jurisdiction zones is automatically, and transparently, provided in an efficient and effective manner.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for automatically managing secure communications across multiple communications jurisdiction zones comprising:

at least one processor; and at least one memory coupled to the at least one processor, the at least one memory having stored therein instructions which when executed by any set of the one or more processors, perform a process for automatically managing secure communications across multiple communications jurisdiction zones, the process for automatically managing secure communications across multiple communications jurisdiction zones including:

identifying two or more communications jurisdiction zones from which, and/or to which, data may be transferred using one or more types of communications channels including one or more types of secure communications security levels;

obtaining communications and data security policy data for the two or more identified communications jurisdiction zones, the communications and data security policy data for the identified communications jurisdiction zones including data indicating allowed types of secure communications security levels for each of the respective communications jurisdiction zones;

obtaining exchange data indicating a desired exchange of data between a first virtual asset in a first communications jurisdiction zone and a second virtual asset in a second communications jurisdiction zone, the first and second communications jurisdiction zones being different from each other, the data to be exchanged being of a type, the type of data being one selected from at least messages, files, images and secrets wherein each data security policy data is based on political regulation in each zone and whereby the zones consist of local, state, national, or regional government agencies;

identifying owner secure communications polices provided by an owner of the data to be transferred;

determining, through examination of the actual data to be exchanged, the type of data to be exchanged;

automatically obtaining first communications jurisdiction zone communications and data security policy data associated with the first communications jurisdiction zone and second communications jurisdiction zone communications and data security policy data associated with second communications jurisdiction zone from the communications and data security policy data;

automatically determining, based on the results of determining the type of data to be exchanged through examining the actual data to be transferred, a required type of communications channel having a type and length of encryption required to be applied to the data to be transferred, the required type of communications channel meeting the data security policy data associated with the first communications jurisdiction zone and data security policy data associated with the second communications jurisdiction zone and the owner secure communications polices provided by the owner of the data to be transferred;

automatically analyzing the first communications jurisdiction zone communications and data security policy data and the second communications jurisdiction zone communications and data security policy data to determine at least one allowed type of secure communications security level for the desired exchange of data that complies with both the first communications jurisdiction zone communications and data security policy data and the second communications jurisdiction zone communications and data security policy data;

selecting one of the at least one allowed type of secure communications security level; and automatically establishing the selected allowed type of communications channel including the allowed type of secure communications security level between the first virtual asset and the second virtual asset.

2. The system for automatically managing secure communications across multiple communications jurisdiction zones of claim 1 wherein at least one of the two or more communications jurisdiction zones are selected from the group of communications jurisdiction zones consisting of:
   a geographic region communications jurisdiction zone;
   a political region communications jurisdiction zone;
   a security based communications jurisdiction zone;
   a computing environment communications jurisdiction zone;
   a computing sub-environment communications jurisdiction zone within a computing environment communications jurisdiction zone; and
   any combination thereof.

3. The system for automatically managing secure communications across multiple communications jurisdiction zones of claim 1 wherein at least one of the one or more types of communications channels is selected from the group of types of communications channels consisting of:
   an SSL communications channel;
   a TLS communications channel;
   an STMP communications channel;
   an SMTP communications channel;
   an STP communications channel;
   an ICMP communications channel; and
   any secure communication protocol channel.

4. The system for automatically managing secure communications across multiple communications jurisdiction zones of claim 1 wherein at least one of the one or more types of secure communications security levels is an encryption level for encrypting data transferred using the one or more types of communications channels and/or encrypting messages transferred using the one or more types of communications channels.

5. The system for automatically managing secure communications across multiple communications jurisdiction zones of claim 4 wherein at least one of the one or more types of encryption levels includes employing one or more types of encryption keys selected form the group of encryption keys consisting of:
   a public encryption key;
   a private encryption key;
   a symmetric encryption key;
   an asymmetric encryption key;
   a public pre-placed encryption key;
   a private pre-placed encryption key;
   a 40-bit encryption key;
   any length encryption keys;
   an authentication encryption key;
   a benign encryption key;
   a content-encryption key (CEK);
   a cryptovariable encryption key;
   a derived encryption key;
   an electronic encryption key;
   an ephemeral encryption key;
   a key encryption key (KEK);
   a key production encryption key (KPK);
   a FIREFLY encryption key;
   a master encryption key;
   a message encryption key (MEK);
   a RED encryption key;
   a session encryption key;
   a traffic encryption key (TEK);
   a transmission security encryption key (TSK);
   a seed encryption key;
   a signature encryption key;
   a stream encryption key;
   a Type 1 encryption key;
   a Type 2 encryption key;
   a Vernam encryption key;
   a zeroized encryption key; and
   any combination thereof.

6. The system for automatically managing secure communications across multiple communications jurisdiction zones of claim 1 wherein at one of the first resource and the second resource are selected from the group of resources consisting of:
   a virtual machine;
   a virtual server;
   a database or data store;
   an instance in a cloud environment;
   a cloud environment access system;
   part of a mobile device;
   part of a remote sensor;
   part of a laptop computing system;
   part of a desktop computing system;
   part of a point-of-sale computing system;
   part of an ATM; and
   part of an electronic voting machine computing system.

7. The system for automatically managing secure communications across multiple communications jurisdiction zones of claim 1 wherein the communications and data security policy data for the identified communications jurisdiction zones is obtained from a secure communications policy manager.

8. The system for automatically managing secure communications across multiple communications jurisdiction zones of claim 7 wherein the communications and data security policy data for the identified communications jurisdiction zones is updated automatically.

9. A system for automatically managing secure communications across multiple communications jurisdiction zones comprising:
   at least one processor; and at least one memory coupled to the at least one processor, the at least one memory having stored therein instructions which when executed by any set of the one or more processors, perform a process for automatically managing secure communications across multiple communications jurisdiction zones, the process for automatically managing secure communications across multiple communications jurisdiction zones including:

identifying two or more communications jurisdiction zones from which, and/or to which, data may be transferred using one or more types of communications channels including one or more types of secure communications security levels;

obtaining communications and data security policy data for the two or more identified communications jurisdiction zones, the communications and data security policy data for the identified communications jurisdiction zones including data indicating allowed types of secure communications security levels for each of the respective communications jurisdiction zones;

obtaining exchange data indicating a desired exchange of data between a first virtual asset in a first communications jurisdiction zone and a second virtual asset in a second communications jurisdiction zone, the first and second communications jurisdiction zones being different from each other, the data to be exchanged being of a type, the type of data being one selected from at least messages, files, images and secrets wherein each data security policy data is based on political regulation in each zone and whereby the zones consist of local, state, national, or regional government agencies;

identifying owner secure communications polices provided by an owner of the data to be transferred;

determining, through examination of the actual data to be exchanged, the type of data to be exchanged;

automatically obtaining first communications jurisdiction zone communications and data security policy data associated with the first communications jurisdiction zone and second communications jurisdiction zone communications and data security policy data associated with second communications jurisdiction zone from the communications and data security policy data;

automatically determining, based on the results of determining the type of data to be exchanged through examining the actual data to be transferred, a required type of communications channel having a type and length of encryption required to be applied to the data to be transferred, the required type of communications channel meeting the data security policy data associated with the first communications jurisdiction zone and data security policy data associated with the second communications jurisdiction zone and the owner secure communications polices provided by the owner of the data to be transferred;

obtaining enterprise data transfer policy data, the enterprise data transfer policy data including data indicating required types of secure communications security levels for one or more types of data;

automatically obtaining data type data indicating the type of data involved in the desired exchange of data;

automatically analyzing the data type data and the enterprise data transfer policy data to determine enterprise allowed types of secure communications security levels data for the desired exchange of data;

automatically analyzing the first communications jurisdiction zone communications and data security policy data, the second communications jurisdiction zone communications and data security policy data, and the enterprise allowed types of secure communications security level data, to determine at least one allowed type of secure communications security level for the desired exchange of data that complies with each of the first communications jurisdiction zone communications and data security policy data, the second communications jurisdiction zone communications and data security policy data, and the enterprise allowed types of secure communications security level data;

selecting one of the at least one allowed type of secure communications security level; and automatically establishing the selected allowed type of communications channel including the allowed type of secure communications security level between the first virtual asset and the second virtual asset.

10. The system for automatically managing secure communications across multiple communications jurisdiction zones of claim 9 wherein at least one of the two or more communications jurisdiction zones are selected from the group of communications jurisdiction zones consisting of:
    a geographic region communications jurisdiction zone;
    a political region communications jurisdiction zone;
    a security based communications jurisdiction zone;
    a computing environment communications jurisdiction zone;
    a computing sub-environment communications jurisdiction zone within a computing environment communications jurisdiction zone; and
    any combination thereof.

11. The system for automatically managing secure communications across multiple communications jurisdiction zones of claim 9 wherein at least one of the one or more types of communications channels is selected from the group of types of communications channels consisting of:
    an SSL communications channel;
    a TLS communications channel;
    an STMP communications channel;
    an SMTP communications channel;
    an STP communications channel;
    an ICMP communications channel; and
    any secure communication protocol channel.

12. The system for automatically managing secure communications across multiple communications jurisdiction zones of claim 9 wherein the enterprise data transfer policy data indicating required types of secure communications security levels for one or more types of data is determined based, at least in part, on at least one data classification factor selected from the group of data classification factors consisting of:
    a determination as to the sensitivity of the data to be transferred as determined by the enterprise charged with protecting the data;
    a determination as to the sensitivity of the data to be transferred as determined by one or more regulations and/or regulatory agencies;
    a determination as to the sensitivity of the data to be transferred as determined based on the need to protect the identity and personal information of the owners and/or sources of the data to be protected;
    a determination of the risk associated with the data to be transferred;
    a determination of the vulnerability associated with the data to be transferred;
    a determination of the commercial value of the data to be transferred;

a determination of the strategic value of the data to be transferred;
a determination of the entertainment value of the data to be transferred; and any combination thereof.

13. The system for automatically managing secure communications across multiple communications jurisdiction zones of claim 9 wherein at least one of the one or more types of secure communications security levels is an encryption level for encrypting data transferred using the one or more types of communications channels and/or encrypting messages transferred using the one or more types of communications channels.

14. The system for automatically managing secure communications across multiple communications jurisdiction zones of claim 13 wherein at least one of the one or more types of encryption levels includes employing one or more types of encryption keys selected form the group of encryption keys consisting of:
   a public encryption key;
   a private encryption key;
   a symmetric encryption key;
   an asymmetric encryption key;
   a public pre-placed encryption key;
   a private pre-placed encryption key;
   a 40-bit encryption key;
   any length encryption keys;
   an authentication encryption key;
   a benign encryption key;
   a content-encryption key (CEK);
   a cryptovariable encryption key;
   a derived encryption key;
   an electronic encryption key;
   an ephemeral encryption key;
   a key encryption key (KEK);
   a key production encryption key (KPK);
   a FIREFLY encryption key;
   a master encryption key;
   a message encryption key (MEK);
   a RED encryption key;
   a session encryption key;
   a traffic encryption key (TEK);
   a transmission security encryption key (TSK);
   a seed encryption key;
   a signature encryption key;
   a stream encryption key;
   a Type 1 encryption key;
   a Type 2 encryption key;
   a Vernam encryption key;
   a zeroized encryption key; and
   any combination thereof.

15. The system for automatically managing secure communications across multiple communications jurisdiction zones of claim 9 wherein the communications and data security policy data for the identified communications jurisdiction zones is obtained from a secure communications policy manager.

16. The system for automatically managing secure communications across multiple communications jurisdiction zones of claim 15 wherein the communications and data security policy data for the identified communications jurisdiction zones is updated automatically.

17. A system for automatically managing secure communications across multiple communications jurisdiction zones comprising:
   at least one processor; and
   at least one memory coupled to the at least one processor, the at least one memory having stored therein instructions which when executed by any set of the one or more processors, perform a process for automatically managing secure communications across multiple communications jurisdiction zones, the process for automatically managing secure communications across multiple communications jurisdiction zones including:
   identifying two or more communications jurisdiction zones from which, and/or to which, data may be transferred using one or more types of communications channels including one or more types of secure communications security levels;
   obtaining communications and data security policy data for the two or more identified communications jurisdiction zones, the communications and data security policy data for the identified communications jurisdiction zones including data indicating allowed types of secure communications security levels for each of the respective communications jurisdiction zones;
   obtaining exchange data indicating a desired exchange of data between a first virtual asset in a first communications jurisdiction zone and a second virtual asset in a second communications jurisdiction zone, the first and second communications jurisdiction zones being different from each other, the data to be exchanged being of a type, the type of data being one selected from at least messages, files, images and secrets wherein each data security policy data is based on political regulation in each zone and whereby the zones consist of local, state, national, or regional government agencies;
   identifying owner secure communications polices provided by an owner of the data to be transferred;
   determining, through examination of the actual data to be exchanged, the type of data to be exchanged;
   automatically obtaining first communications jurisdiction zone communications and data security policy data associated with the first communications jurisdiction zone and second communications jurisdiction zone communications and data security policy data associated with second communications jurisdiction zone from the communications and data security policy data;
   automatically determining, based on the results of determining the type of data to be exchanged through examining the actual data to be transferred, a required type of communications channel having a type and length of encryption required to be applied to the data to be transferred, the required type of communications channel meeting the data security policy data associated with the first communications jurisdiction zone and data security policy data associated with the second communications jurisdiction zone and the secure communications polices provided by the owner of the data to be transferred;
   obtaining data owner data transfer policy data, the data owner data transfer policy data including data indicating owner required types of secure communications security levels for one or more types of data;
   automatically obtaining data type data indicating the type of data involved in the desired exchange of data;
   automatically analyzing the first communications jurisdiction zone communications and data security policy data, the second communications jurisdiction zone communications and data security policy data, and data owner allowed types of secure communications security level data, to determine at least one allowed type of secure communications security level for the desired exchange of data that complies with each of the first communications jurisdiction zone communications and data security policy data, the second communications jurisdiction zone communications and data security policy data, and the owner secure communications polices provided by the owner of the data to be transferred;

selecting one of the at least one allowed type of secure communications security level; and automatically establishing the selected allowed type of communications channel including the allowed type of secure communications security level between the first virtual asset and the second virtual asset.

18. The system for automatically managing secure communications across multiple communications jurisdiction zones of claim 17 wherein at least one of the two or more communications jurisdiction zones are selected from the group of communications jurisdiction zones consisting of:
   a geographic region communications jurisdiction zone;
   a political region communications jurisdiction zone;
   a security based communications jurisdiction zone;
   a computing environment communications jurisdiction zone;
   a computing sub-environment communications jurisdiction zone within a computing environment communications jurisdiction zone; and
   any combination thereof.

19. The system for automatically managing secure communications across multiple communications jurisdiction zones of claim 17 wherein at least one of the one or more types of communications channels is selected from the group of types of communications channels consisting of:
   an SSL communications channel;
   a TLS communications channel;
   an STMP communications channel;
   an SMTP communications channel;
   an STP communications channel;
   an ICMP communications channel; and
   any secure communication protocol channel.

20. The system for automatically managing secure communications across multiple communications jurisdiction zones of claim 17 wherein at least one of the one or more types of secure communications security levels is an encryption level for encrypting data transferred using the one or more types of communications channels and/or encrypting messages transferred using the one or more types of communications channels.

21. The system for automatically managing secure communications across multiple communications jurisdiction zones of claim 20 wherein at least one of the one or more types of encryption levels includes employing one or more types of encryption keys selected form the group of encryption keys consisting of:
   a public encryption key;
   a private encryption key;
   a symmetric encryption key;
   an asymmetric encryption key;
   a public pre-placed encryption key;
   a private pre-placed encryption key;
   a 40-bit encryption key;
   any length encryption keys;
   an authentication encryption key;
   a benign encryption key;
   a content-encryption key (CEK);
   a cryptovariable encryption key;
   a derived encryption key;
   an electronic encryption key;
   an ephemeral encryption key;
   a key encryption key (KEK);
   a key production encryption key (KPK);
   a FIREFLY encryption key;
   a master encryption key;
   a message encryption key (MEK);
   a RED encryption key;
   a session encryption key;
   a traffic encryption key (TEK);
   a transmission security encryption key (TSK);
   a seed encryption key;
   a signature encryption key;
   a stream encryption key;
   a Type 1 encryption key;
   a Type 2 encryption key;
   a Vernam encryption key;
   a zeroized encryption key; and
   any combination thereof.

22. The system for automatically managing secure communications across multiple communications jurisdiction zones of claim 20 wherein the communications and data security policy data for the identified communications jurisdiction zones is obtained from a secure communications policy manager.

23. The system for automatically managing secure communications across multiple communications jurisdiction zones of claim 22 wherein the communications and data security policy data for the identified communications jurisdiction zones is updated automatically.

24. A system for automatically managing secure communications across multiple communications jurisdiction zones comprising:
   at least one processor; and
   at least one memory coupled to the at least one processor, the at least one memory having stored therein instructions which when executed by any set of the one or more processors, perform a process for automatically managing secure communications across multiple communications jurisdiction zones, the process for automatically managing secure communications across multiple communications jurisdiction zones including:
   identifying two or more communications jurisdiction zones from which, and/or to which, data may be transferred using one or more types of communications channels including one or more types of secure communications security levels;
   obtaining communications and data security policy data for the two or more identified communications jurisdiction zones, the communications and data security policy data for the identified communications jurisdiction zones including data indicating allowed types of secure communications security levels for each of the respective communications jurisdiction zones;
   obtaining exchange data indicating a desired exchange of data between a first virtual asset in a first communications jurisdiction zone and a second virtual asset in a second communications jurisdiction zone, the first and second communications jurisdiction zones being different from each other, the data to be exchanged being of a type, the type of data being one selected from at least messages, files, images and secrets wherein each data security policy data is based on political regulation in each zone and whereby the zones consist of local, state, national, or regional government agencies;
   identifying owner secure communications polices provided by an owner of the data to be transferred;
   determining, through examination of the actual data to be exchanged, the type of data to be exchanged;

automatically obtaining first communications jurisdiction zone communications and data security policy data associated with the first communications jurisdiction zone and second communications jurisdiction zone communications and data security policy data associated with second communications jurisdiction zone from the communications and data security policy data;

automatically determining, based on the results of determining the type of data to be exchanged through examining the actual data to be transferred, a required type of communications channel having a type and length of encryption required to be applied to the data to be transferred, the required type of communications channel meeting the data security policy data associated with the first communications jurisdiction zone and data security policy data associated with the second communications jurisdiction zone and the owner secure communications polices provided by the owner of the data to be transferred;

obtaining enterprise data transfer policy data, the enterprise data transfer policy data including data indicating required types of secure communications security levels for one or more types of data;

automatically obtaining data type data indicating the type of data involved in the desired exchange of data;

automatically analyzing the data type data and the enterprise data transfer policy data to determine enterprise allowed types of secure communications security levels data for the desired exchange of data;

obtaining data owner data transfer policy data, the data owner data transfer policy data including data indicating owner required types of secure communications security levels for one or more types of data;

automatically analyzing the first communications jurisdiction zone communications and data security policy data, the second communications jurisdiction zone communications and data security policy data, the enterprise allowed types of secure communications security level data, and the data owner allowed types of secure communications security level data, to determine at least one allowed type of secure communications security level for the desired exchange of data that complies with each of the first communications jurisdiction zone communications and data security policy data, the second communications jurisdiction zone communications and data security policy data, the enterprise allowed types of secure communications security level data, and the owner secure communications polices provided by the owner of the data to be transferred;

selecting one of the at least one allowed type of secure communications security level; and automatically establishing the selected allowed type of communications channel including the allowed type of secure communications security level between the first virtual asset and the second virtual asset.

25. The system for automatically managing secure communications across multiple communications jurisdiction zones of claim 24 wherein at least one of the two or more communications jurisdiction zones are selected from the group of communications jurisdiction zones consisting of:
 a geographic region communications jurisdiction zone;
 a political region communications jurisdiction zone;
 a security based communications jurisdiction zone;
 a computing environment communications jurisdiction zone;
 a computing sub-environment communications jurisdiction zone within a computing environment communications jurisdiction zone; and
 any combination thereof.

26. The system for automatically managing secure communications across multiple communications jurisdiction zones of claim 24 wherein at least one of the one or more types of communications channels is selected from the group of types of communications channels consisting of:
 an SSL communications channel;
 a TLS communications channel;
 an STMP communications channel;
 an SMTP communications channel;
 an STP communications channel;
 an ICMP communications channel; and
 any secure communication protocol channel.

27. The system for automatically managing secure communications across multiple communications jurisdiction zones of claim 24 wherein the enterprise data transfer policy data indicating required types of secure communications security levels for one or more types of data is determined based, at least in part, on at least one data classification factor selected from the group of data classification factors consisting of:
 a determination as to the sensitivity of the data to be transferred as determined by the enterprise charged with protecting the data;
 a determination as to the sensitivity of the data to be transferred as determined by one or more regulations and/or regulatory agencies;
 a determination as to the sensitivity of the data to be transferred as determined based on the need to protect the identity and personal information of the owners and/or sources of the data to be protected;
 a determination of the risk associated with the data to be transferred;
 a determination of the vulnerability associated with the data to be transferred;
 a determination of the commercial value of the data to be transferred;
 a determination of the strategic value of the data to be transferred;
 a determination of the entertainment value of the data to be transferred; and any combination thereof.

28. The system for automatically managing secure communications across multiple communications jurisdiction zones of claim 24 wherein at least one of the one or more types of secure communications security levels is an encryption level for encrypting data transferred using the one or more types of communications channels and/or encrypting messages transferred using the one or more types of communications channels.

29. The system for automatically managing secure communications across multiple communications jurisdiction zones of claim 28 wherein at least one of the one or more types of encryption levels includes employing one or more types of encryption keys selected form the group of encryption keys consisting of:
 a public encryption key;
 private encryption key;
 a symmetric encryption key;
 an asymmetric encryption key;
 a public pre-placed encryption key;
 a private pre-placed encryption key;
 a 40-bit encryption key;
 any length encryption keys;
 an authentication encryption key;

a benign encryption key;
a content-encryption key (CEK);
a cryptovariable encryption key;
a derived encryption key;
an electronic encryption key;
an ephemeral encryption key;
a key encryption key (KEK);
a key production encryption key (KPK);
a FIREFLY encryption key;
a master encryption key;
a message encryption key (MEK);
a RED encryption key;
a session encryption key;
a traffic encryption key (TEK);
a transmission security encryption key (TSK);
a seed encryption key;
a signature encryption key;
a stream encryption key;
a Type 1 encryption key;
a Type 2 encryption key;
a Vernam encryption key;
a zeroized encryption key; and
any combination thereof.

30. The system for automatically managing secure communications across multiple communications jurisdiction zones of claim 24 wherein the communications and data security policy data for the identified communications jurisdiction zones is obtained from a secure communications policy manager.

31. The system for automatically managing secure communications across multiple communications jurisdiction zones of claim 30 wherein the communications and data security policy data for the identified communications jurisdiction zones is updated automatically.

* * * * *